United States Patent
Liao et al.

(10) Patent No.: US 11,100,039 B2
(45) Date of Patent: Aug. 24, 2021

(54) INTERCONNECTION SYSTEM, AND INTERCONNECTION CONTROL METHOD AND APPARATUS

(71) Applicant: Huawei Technologies Co., Ltd., Shenzhen (CN)

(72) Inventors: Defu Liao, Shenzhen (CN); Fei Zhang, Hangzhou (CN); Honghui Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/673,253

(22) Filed: Nov. 4, 2019

(65) Prior Publication Data

US 2020/0065291 A1    Feb. 27, 2020

Related U.S. Application Data

(63) Continuation of application No. PCT/CN2017/083020, filed on May 4, 2017.

(51) Int. Cl.
*G06F 15/163* (2006.01)
*G06F 13/40* (2006.01)
*G06F 15/17* (2006.01)

(52) U.S. Cl.
CPC ........ *G06F 15/163* (2013.01); *G06F 13/4022* (2013.01); *G06F 15/17* (2013.01)

(58) Field of Classification Search
None
See application file for complete search history.

(56) References Cited

U.S. PATENT DOCUMENTS

| 5,566,171 | A | * | 10/1996 | Levinson | ................ | H04L 12/52 |
| | | | | | | 370/249 |
| 8,990,460 | B2 | * | 3/2015 | Chang | ................. | G06F 13/4282 |
| | | | | | | 710/70 |
| 2005/0021699 | A1 | | 1/2005 | Kota et al. | | |
| 2005/0117550 | A1 | | 6/2005 | Matsumura | | |
| 2007/0073998 | A1 | | 3/2007 | Chung et al. | | |
| 2011/0010468 | A1 | * | 1/2011 | Hu | .......................... | G06F 15/16 |
| | | | | | | 709/250 |
| 2011/0096786 | A1 | * | 4/2011 | Brueggen | ............. | H04L 49/552 |
| | | | | | | 370/400 |

(Continued)

FOREIGN PATENT DOCUMENTS

| CN | 1940904 A | 4/2007 |
| CN | 101699425 A | 4/2010 |

(Continued)

*Primary Examiner* — Steven G Snyder
(74) *Attorney, Agent, or Firm* — Conley Rose, P.C.

(57) ABSTRACT

An interconnection system including a first gating unit and a second gating unit is provided. The first gating unit includes two terminals, with one terminal connecting to a first CPU directly, where the two terminals are indirectly connected when the first gating unit is in a first state. The second gating unit includes two terminals, with one terminal connecting to a second CPU, where the two terminals are connected when the second gating unit is in the first state. Another terminal of the first gating unit is connected to another terminal of the second gating unit. If both the first gating unit and the second gating unit are in the first state, the first CPU is connected to the second CPU.

14 Claims, 15 Drawing Sheets

(56) References Cited

U.S. PATENT DOCUMENTS

| | | |
|---|---|---|
| 2011/0202696 A1 | 8/2011 | Kitahara |
| 2013/0067197 A1 | 3/2013 | Liu et al. |
| 2013/0073814 A1 | 3/2013 | Wang et al. |
| 2013/0103875 A1* | 4/2013 | Chang ................ G06F 13/4282 710/310 |
| 2013/0103975 A1* | 4/2013 | Tan .................... G06F 11/2002 714/4.2 |
| 2013/0262735 A1 | 10/2013 | Ikeda |
| 2014/0044228 A1 | 2/2014 | Jang |
| 2015/0006776 A1 | 1/2015 | Liu et al. |
| 2016/0077985 A1* | 3/2016 | Gostin .................. G06F 13/20 710/300 |
| 2016/0179724 A1 | 6/2016 | Schneider et al. |
| 2017/0364475 A1* | 12/2017 | Liu .................... G06F 15/8023 |
| 2018/0181536 A1 | 6/2018 | Liao |

FOREIGN PATENT DOCUMENTS

| | | | |
|---|---|---|---|
| CN | 102141975 A | 8/2011 | |
| CN | 102232218 A | 11/2011 | |
| CN | 103578395 A | 2/2014 | |
| CN | 105205032 A | 12/2015 | |
| CN | 105247476 A | 1/2016 | |
| CN | 105634694 A | 6/2016 | |
| CN | 105720967 A | 6/2016 | |
| CN | 105808499 A | 7/2016 | |
| CN | 106104505 A | 11/2016 | |
| EP | 3605350 A1 * | 2/2020 | ............. G06F 15/17 |
| WO | 2017031978 A1 | 3/2017 | |

\* cited by examiner

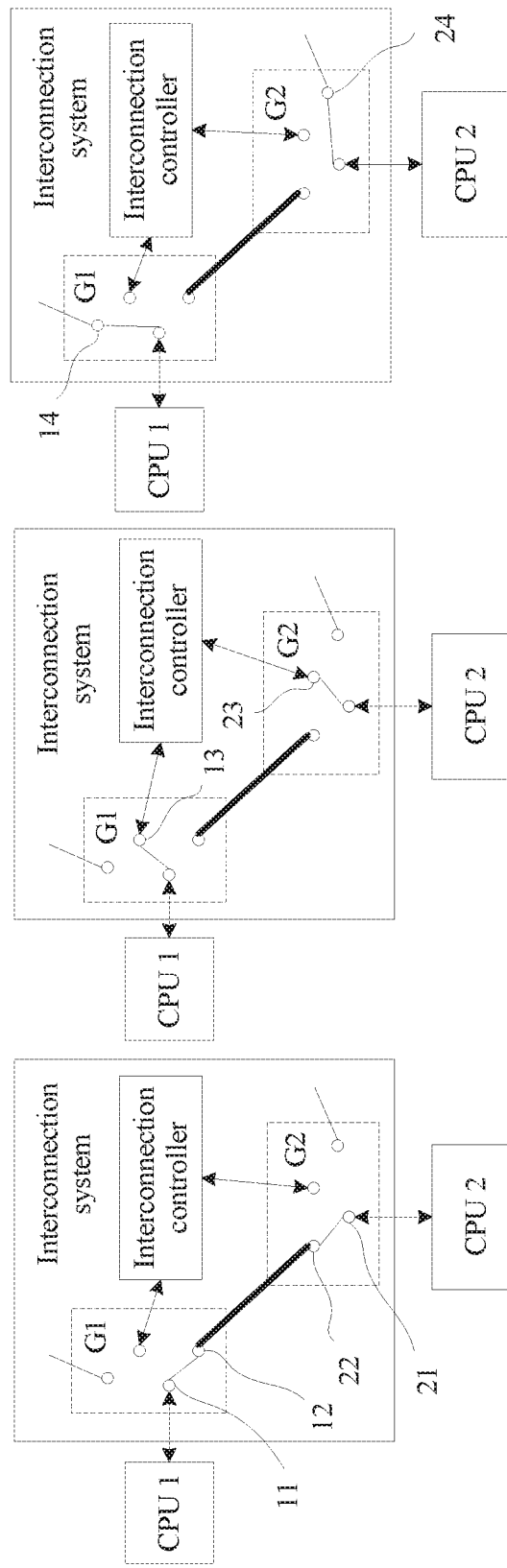

INTERCONNECTION SYSTEM, AND INTERCONNECTION CONTROL METHOD AND APPARATUS

CROSS-REFERENCE TO RELATED APPLICATION

This application is a continuation of International Patent Application No. PCT/CN2017/083020, filed on May 4, 2017, the disclosure of which is hereby incorporated by reference in its entirety.

TECHNICAL FIELD

This application relates to the field of electronic technologies, and in particular, to an interconnection system, and an interconnection control method and apparatus.

BACKGROUND

A node controller (NC) may connect central processing units (CPUs) in a plurality of nodes. Two CPUs belonging to different nodes exchange data using the NC, in order to implement cooperative work of a plurality of nodes, thereby improving CPU utilization of each node. When a cross-node collaboration is not required, the NC may prohibit the CPU from transmitting data across nodes.

In other approaches, a CPU exchanges data with an NC using a Quick Path interconnect (QPI) interface. When the NC prohibits the CPU from transmitting data across nodes, a connection between the CPU and the NC through the QPI interface is idled.

SUMMARY

This application provides an interconnection system, and an interconnection control method and apparatus, such that a connection between a plurality of CPUs can be newly added.

A first aspect of this application provides an interconnection system. The interconnection system includes a first gating unit and a second gating unit. The first gating unit includes a first terminal and a second terminal. The first terminal of the first gating unit is directly connected to a first CPU. Alternatively, the first terminal of the first gating unit is connected to a third gating unit of a first NC, in order to connect to the first CPU using the third gating unit. When the first gating unit is in a first state, the first terminal of the first gating unit is connected to the second terminal of the first gating unit. The second gating unit includes a first terminal and a second terminal. The first terminal of the second gating unit is connected to a second CPU. When the second gating unit is in the first state, the first terminal of the second gating unit is connected to the second terminal of the second gating unit. The second terminal of the first gating unit is connected to the second terminal of the second gating unit. If both the first gating unit and the second gating unit are in the first state, the first CPU is connected to the second CPU.

In this way, if the first CPU and the second CPU belong to a same node, a connection within the node and a connection established using the gating units are included between the first CPU and the second CPU, such that data transmission bandwidth between the first CPU and the second CPU is increased.

If the first CPU and the second CPU belong to different nodes, but the nodes to which the first CPU and the second CPU respectively belong are located in a same hard zone, the first CPU and the second CPU may establish a connection using the gating units.

Optionally, the first NC and the interconnection system are different or the same.

In a possible design, the second terminal of the first gating unit is connected to the second terminal of the second gating unit using a first line.

In this way, when both the first gating unit and the second gating unit are in the first state, the first CPU is connected to the second CPU using the first line. The first line may be a circuit that has a signal transmission capability. For example, the first line may be a bus such as a QPI bus.

In a possible design, the interconnection system further includes an interconnection controller. The first gating unit further includes a third terminal, the second gating unit further includes a third terminal, and both the third terminal of the first gating unit and the third terminal of the second gating unit are connected to the interconnection controller. When the first gating unit is in a second state, the first terminal of the first gating unit is connected to the third terminal of the first gating unit. When the second gating unit is in the second state, the first terminal of the second gating unit is connected to the third terminal of the second gating unit. When both the first gating unit and the second gating unit are in the second state, data may be forwarded between the first CPU and the second CPU using the interconnection controller.

In a possible design, the first gating unit further includes a fourth terminal, the second gating unit further includes a fourth terminal, and neither the fourth terminal of the first gating unit nor the fourth terminal of the second gating unit is connected to a component. When the first gating unit is in a third state, the first terminal of the first gating unit is connected to the fourth terminal of the first gating unit, such that the first CPU connected to the first gating unit cannot transmit data using the first gating unit. When the second gating unit is in the third state, the first terminal of the second gating unit is connected to the fourth terminal of the second gating unit, such that the second CPU connected to the second gating unit cannot transmit data using the second gating unit.

In a possible design, the interconnection controller may set the first gating unit and the second gating unit to a state, for example, set to the first state, the second state, or the third state. In this way, the gating units (the first gating unit and the second gating unit) are separately set to different states, such that the interconnection controller can control, using the gating units, whether data can be transmitted between the first CPU and the second CPU, and can control whether to forward data using the interconnection controller when the first CPU exchanges data with the second CPU.

In a possible design, the interconnection controller is a baseboard management controller (BMC) or an NC.

In a possible design, the first NC includes the third gating unit and a fourth gating unit. The third gating unit includes a first terminal and a second terminal, and the first terminal of the third gating unit is configured to connect to the first terminal of the first gating unit. When the third gating unit is in the first state, the first terminal of the third gating unit is connected to the second terminal of the third gating unit. The fourth gating unit includes a first terminal and a second terminal, and the first terminal of the fourth gating unit is configured to connect to the first CPU, or configured to connect to a fifth gating unit of a second NC, in order to connect to the first CPU using the fifth gating unit. When the fourth gating unit is in the first state, the first terminal of the fourth gating unit is connected to the second terminal of the fourth gating unit. The second terminal of the third gating unit is connected to the second terminal of the fourth gating unit. If both the third gating unit and the fourth gating unit are in the first state, the first terminal of the first gating unit is connected to the first CPU using the third gating unit. Therefore, when the first gating unit, the second gating unit, the third gating unit, and the fourth gating unit are all in the first state, the first CPU is connected to the second CPU using the first NC.

Optionally, the second NC, the first NC, and the interconnection system are different or the same.

Similarly, the first CPU may be connected to the second CPU using a plurality of NCs (for example, using the second NC and the first NC).

In a possible design, the second terminal of the third gating unit is connected to the second terminal of the fourth gating unit using a second line. In this way, when both the third gating unit and the fourth gating unit are in the first state, the first terminal of the first gating unit is connected to the first CPU using the second line.

A second aspect of this application provides an interconnection control method. The interconnection control method is applied to I gating unit groups, where I is greater than or equal to I. Each of the I gating unit groups includes at least two gating units, where all gating units in the gating unit groups are connected in series between two CPUs. The two CPUs are connected when all the gating units in the gating unit groups are in a first state, and the two CPUs are located in one CPU group. In the interconnection control method, a correspondence between a hard zone and a CPU is obtained. According to the correspondence between the hard zone and an identifier of the CPU, all CPUs included in each hard zone may be determined, and every two CPUs in all the CPUs included in the hard zone are located in one CPU group. J CPU groups for which connections are to be established are determined, where J is a positive integer less than or equal to I. Additionally, J gating unit groups that establish connections for the J CPU groups are determined from the I gating unit groups. All gating units in each of the J gating unit groups are set to the first state. When all the gating units in each of the J gating unit groups are in the first state, two CPUs included in a CPU group corresponding to each gating unit group are connected, such that two CPUs included in each of the J CPU groups are connected. In this way, if two CPUs included in a CPU group belong to a same node, a connection within the node and a connection established using the gating unit group are included between the two CPUs, such that data transmission bandwidth between the two CPUs is increased. If the two CPUs belong to different nodes, but the nodes to which the two CPUs respectively belong are both located in a same hard zone, the two CPUs may establish a connection using the gating unit group.

In a possible design, setting all gating units in each of the J gating unit groups to the first state includes: obtaining statuses of all the gating units in each of the J gating unit groups; determining K gating unit groups in the J gating unit groups, where each of the K gating unit groups includes a gating unit that is not in the first state, and K is a positive integer less than or equal to J; and setting the gating unit that is not in the first state in the K gating unit groups to the first state.

In this way, if the J gating unit groups have a gating unit that is in the first state, in this possible design, an instruction is provided to set only the gating unit that is not in the first state in the K gating unit groups to the first state, and there is no need to provide an instruction to set all gating units in the J gating unit groups to the first state, such that bandwidth occupied by the instruction is reduced, a service life of a gating unit is prolonged, and utilization of a gating unit is improved.

In a possible design, setting all gating units in each of the J gating unit groups to the first state includes: determining an interconnection controller corresponding to each gating unit included in each of the J gating unit groups; and instructing the interconnection controller corresponding to each gating unit included in each of the J gating unit groups to set the gating unit to the first state. In this way, when a plurality of gating units in the j gating unit groups are controlled by different interconnection controllers, the plurality of gating units may be set to the first state using different interconnection controllers.

A third aspect of this application provides an interconnection control method. In this method, an interconnection controller receives a second instruction. The second instruction includes an identifier of a gating unit that is to be set to a first state by the interconnection controller. The interconnection controller sets the gating unit to the first state according to the second instruction. In this way, when a plurality of gating units are controlled by different interconnection controllers, the plurality of gating units may be set to the first state using different interconnection controllers.

In a possible design, after receiving the second instruction, the interconnection controller sets the gating unit indicated by the identifier included in the second instruction to the first state.

In a possible design, after receiving the second instruction, the interconnection controller obtains, according to the identifier included in the second instruction, a status of a gating unit specified by the second instruction (that is, the gating unit indicated by the identifier included in the second instruction). If the status of the gating unit is not the first state, the gating unit is not set to the first state.

A fourth aspect of this application provides an interconnection control apparatus. The interconnection control apparatus includes functional units for implementing the interconnection control method provided in the second aspect or the various possible designs of the second aspect. Alternatively, the interconnection control apparatus includes functional units for implementing the interconnection control method provided in the third aspect or the various possible designs of the third aspect.

A fifth aspect of this application provides a baseboard management controller BMC. Functional units for implementing the interconnection control method provided in the second aspect or the various possible designs of the second aspect are deployed in the BMC. Alternatively, functional units for implementing the interconnection control method provided in the third aspect or the various possible designs of the third aspect are deployed in the BMC.

A sixth aspect of this application provides a chassis management controller (CMC). Functional units for implementing the interconnection control method provided in the second aspect or the various possible designs of the second aspect are deployed in the CMC. Alternatively, functional units for implementing the interconnection control method provided in the third aspect or the various possible designs of the third aspect are deployed in the CMC A seventh aspect of this application provides a computer-readable storage medium. The computer readable storage medium stores an instruction. When the instruction is executed, an interconnection control apparatus is enabled to perform the interconnection control method provided in any one of the second aspect or the various possible designs of the second aspect, or an interconnection controller is enabled to perform the interconnection control method provided in any one of the third aspect or the various possible designs of the third aspect.

An eighth aspect of this application provides a computer program product that includes an instruction. When the instruction is executed, an interconnection control apparatus (which may be a BMC) is enabled to perform the interconnection control method provided in any one of the second aspect or the various possible designs of the second aspect, or an interconnection controller is enabled to perform the interconnection control method provided in any one of the third aspect or the various possible designs of the third aspect.

A ninth aspect of this application provides a computer device, including the interconnection system provided in the first aspect or the various possible designs of the first aspect.

BRIEF DESCRIPTION OF DRAWINGS

To describe the technical solutions in the embodiments of the present application more clearly, the following briefly describes the accompanying drawings for describing the embodiments. The accompanying drawings in the following description show merely some embodiments of the present application, and persons of ordinary skill in the art may still derive other drawings from these accompanying drawings without creative efforts.

FIG. 1B(a), FIG. 1B(b) and FIG. 1B(c) show three statuses of a gating unit in the interconnection system of FIG. 1A;

DESCRIPTION OF EMBODIMENTS

The following further describes implementations of the present application in detail with reference to accompanying drawings.

In this application, a first terminal of a gating unit is connected to a CPU, and a third terminal of the gating unit is connected to an interconnection controller of an interconnection system. "A gating unit being in a first state" means that a first terminal of a gating unit is connected to a second terminal of the gating unit. "A gating unit being in a second state" means that a first terminal of a gating unit is connected to a third terminal of the gating unit. "A gating unit being in a third state" means that a first terminal of a gating unit is connected to a fourth terminal of the gating unit. A "line", a "first line", or a "second line" may be a QPI bus. A "connection" may be a communications connection, for example, a signal is transmitted by means of an electrical or optical connection, or a signal is transmitted by means of electromagnetic coupling.

A node controller (NC) may connect central processing units (CPU) in a plurality of nodes. When two CPUs belonging to two nodes exchange data, the NC performs data transmission between the two CPUs across nodes. A node includes at least two CPUs, and each CPU is connected to at least one another CPU in the node.

Interconnection System Embodiment

Figure 1A:
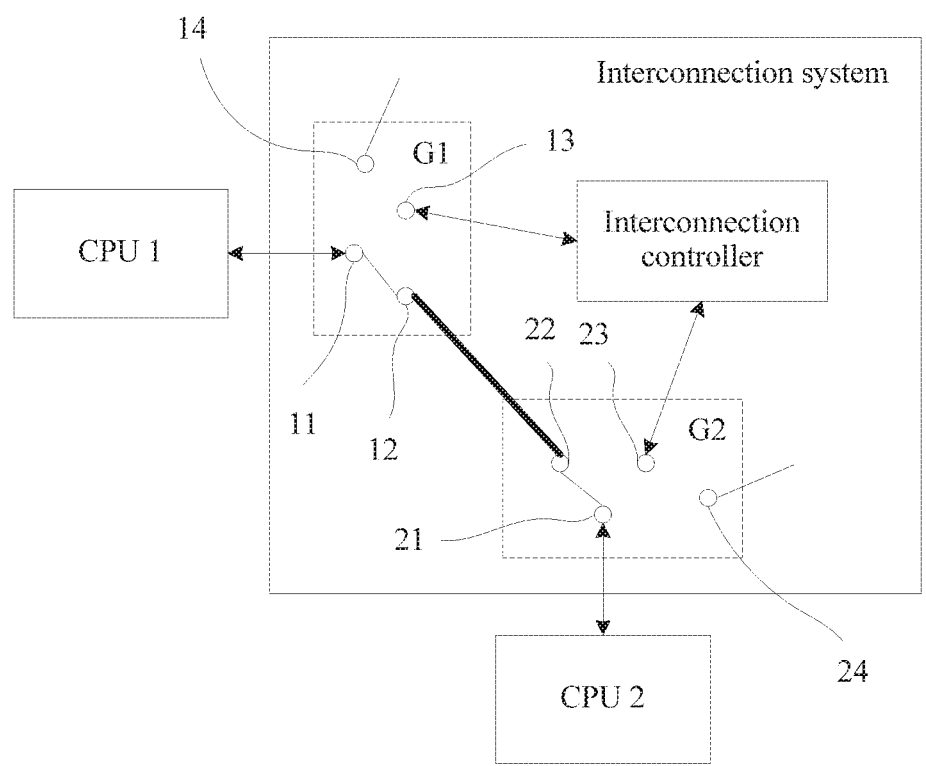
FIG. 1A is a schematic structural diagram of an interconnection system according to an embodiment of the present application.

FIG. 1A is a schematic structural diagram of an interconnection system according to an embodiment of the present application. The interconnection system includes an interconnection controller and a plurality of gating units. For ease of description, FIG. 1A shows only two gating units (gating units G1 and G2).

Referring to FIG. 1A, the gating unit G1 includes a first terminal 11 and a second terminal 12. The first terminal 11 is configured to connect to a central processing unit (CPU) 1. When the gating unit G1 is set to a first state by the interconnection controller, the first terminal 11 and the second terminal 12 that are of the gating unit G1 are connected, as shown in (a) in FIG. 1B.

Referring to FIG. 1A, the gating unit G2 includes a first terminal 21 and a second terminal 22. The first terminal 21 is configured to connect to a CPU 2. When the gating unit G2 is set to the first state by the interconnection controller, the first terminal 21 and the second terminal 22 that are of the gating unit G2 are connected, as shown in (a) in FIG. 1B.

Referring to FIG. 1A, the second terminal 12 of the gating unit G1 is configured to connect to the second terminal 22 of the gating unit G2 using a first line. Therefore, when both the gating unit G1 and the gating unit G2 are set to the first state, the CPU 1 and the CPU 2 are connected using the first line. For example, when both the gating unit G1 and the gating unit G2 are set to the first state, the CPU 1 may establish, based on a Quick Path Interconnect (QPI) protocol, a connection to the CPU 2 using the first line.

Optionally, referring to FIG. 1A, the gating unit G1 may include a third terminal 13. The third terminal 13 is connected to the interconnection controller. When the gating unit G1 is set to a second state by the interconnection controller, the first terminal 11 and the third terminal 13 that are of the gating unit G1 are connected, as shown in (b) in FIG. 1B. In this way, the CPU 1 may exchange data with the interconnection controller using the gating unit G1.

The gating unit G2 may include a third terminal 23. The third terminal 23 is connected to the interconnection controller. When the gating unit G2 is set to the second state by the interconnection controller, the first terminal 21 and the third terminal 23 that are of the gating unit G2 are connected, as shown in (b) in FIG. 1B. In this way, the CPU 2 may exchange data with the interconnection controller using the gating unit G1.

As shown in (b) in FIG. 1B, when both the gating unit G1 and the gating unit G2 are set to the second state by the interconnection controller, the interconnection controller may forward data between the CPU 1 and the CPU 2.

Optionally, referring to FIG. 1A, the gating unit G1 may include a fourth terminal 14. The fourth terminal 14 is not connected to a component. For example, the fourth terminal is suspended or grounded. When the gating unit G1 is set to a third state by the interconnection controller, the first terminal 11 and the fourth terminal 14 that are of the gating unit G1 are connected, as shown in (c) in FIG. 1B. In this way, the CPU 1 connected to the first terminal 11 cannot exchange data with another component using the gating unit G1.

Referring to FIG. 1A, the gating unit G2 may include a fourth terminal 24. The fourth terminal 24 is not connected to a component. For example, the fourth terminal is suspended or grounded. When the gating unit G2 is set to the third state by the interconnection controller, the first terminal 21 and the fourth terminal 24 that are of the gating unit G2 are connected, as shown in (c) in FIG. 1B. In this way, the CPU 2 connected to the first terminal 21 cannot exchange data with another component using the gating unit G2.

FIG. 1A and FIG. 1B(a), FIG. 1B(b) and FIG. 1B(c) show a scenario in which the interconnection system connects two CPUs (the CPU 1 and the CPU 2) using two gating units (the gating units G1 and G2). In another embodiment of this application, two CPUs (a CPU 1 and a CPU 2) are connected using an interconnection system and at least one node controller (NC). For example, FIG. 1C shows a scenario in which a CPU 1 and a CPU 2 are connected using one NC and an interconnection system.

Figure 1C:
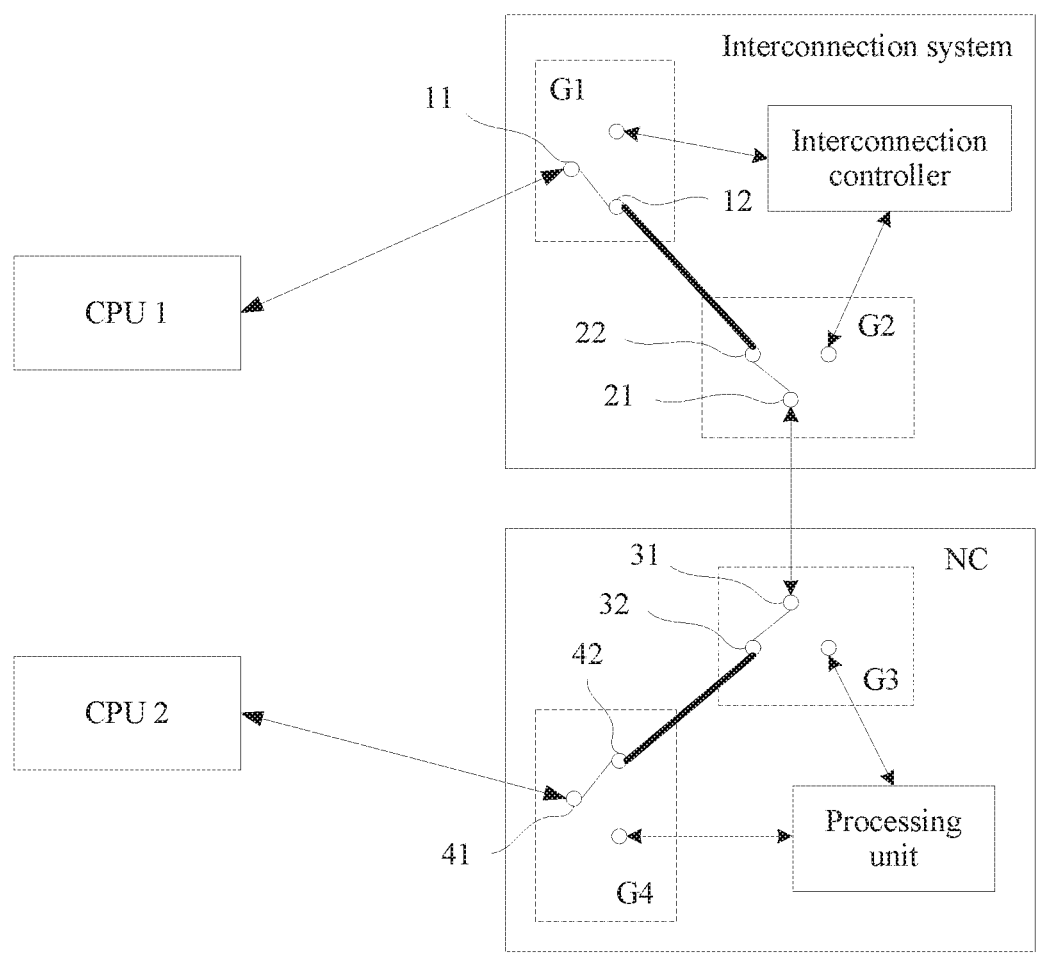
FIG. 1C is a schematic structural diagram in which a CPU 1 is connected to a CPU 2 using an interconnection system and an NC.

The NC shown in FIG. 1C may be an implementation of the interconnection system shown in FIG. 1A. The NC includes a gating unit G3, a gating unit G4, and a processing unit. The gating unit G3 includes a first terminal 31, a second terminal 32, and a third terminal. The gating unit G4 includes a first terminal 41, a second terminal 42, and a third terminal. Both the third terminal of the gating unit G3 and the third terminal of the gating unit G4 are connected to the processing unit. The processing unit includes a function of controlling a gating unit (for example, the gating units G3 and G4). For example, the processing unit may set the gating units G3 and G4 to a first state or a second state. When both the gating units G3 and G4 are set to the second state, and gating units G1 and G2 are set to the first state, the CPU 1 and the CPU 2 are connected, and the processing unit of the NC forwards data between the CPU 1 and the CPU 2.

Referring to FIG. 1C, a first terminal 11 of the gating unit G1 of the interconnection system is connected to the CPU 1. A second terminal 12 of the gating unit G1 is configured to connect to a second terminal 22 of the gating unit G2 using a first line. A first terminal 21 of the gating unit G2 is connected to the first terminal 31 of the gating unit G3 of the NC.

The second terminal 32 of the gating unit G3 is connected to the second terminal 42 of the gating unit G4 using a second line. The first terminal 41 of the gating unit G4 is connected to the CPU 2.

When both the gating unit G1 and the gating unit G2 are set to the first state by an interconnection controller of the interconnection system, and both the gating unit G3 and the gating unit G4 are set to the first state by the processing unit of the NC, the CPU 1 is connected to the CPU 2 using the first line and the second line.

Based on FIG. 1C, if the first terminal 21 of the gating unit G2 is connected to the CPU 2 using gating units included, in a plurality of NCs, the gating units included in the plurality of NCs are connected in series. A principle of a serial connection implementation is the same as that of a serial connection implementation of the gating unit G1, the gating unit G2, the gating unit G3, and the gating unit G4 in FIG. 1C, and details are not described herein.

Based on FIG. 1C, in an alternative solution of the implementation solution in which the first terminal 11 of the gating unit G1 is directly connected to the CPU 1, the first terminal 11 of the gating unit G1 may alternatively be connected to the CPU 1 using at least one NC.

Figure 1D:
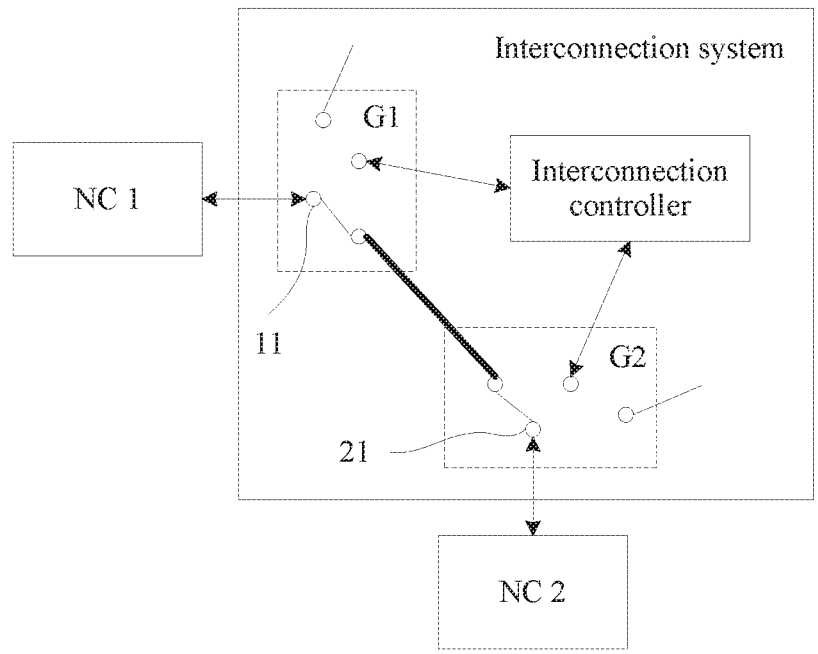
FIG. 1D is a schematic structural diagram of an interconnection system according to an embodiment of the present application.

Therefore, referring to FIG. 1D, the first terminal 11 of the gating unit G1 of the interconnection system may be connected to the CPU 1 using a gating unit of an NC 1. The first terminal 21 of the gating unit G2 of the interconnection system may be connected to the CPU 2 using a gating unit of an NC 2. In this way, the CPU 1 may be connected to the CPU 2 using the NC 1 and the NC 2, or the CPU 1 may be connected to the CPU 2 using the NC 1, the interconnection system, and the NC 2.

Referring to FIG. 1A, FIG. 1B(a), FIG. 1B(b) and FIG. 1B(c), FIG. 1C, and FIG. 1D, the interconnection controller may control each gating unit of the interconnection system, for example, set one or more gating units in the interconnection system to a state (for example, the first state, the second state, or the third state). Optionally, for a gating unit such as the gating unit G1 in the interconnection system, the gating unit may be set to a state (for example, the first state, the second state, or the third state) by means of a manual operation, and the interconnection controller may detect the status to which the gating unit is manually set.

Optionally, the gating unit mentioned in this application document may be a switch circuit, or may be any component that controls the first terminal to be disconnected from or connected to another terminal (such as the second terminal, the third terminal, or the fourth terminal). For example, either of the gating unit G1 and the gating unit G2 in FIG. 1A, B(a), FIG. 1B(b), FIG. 1B(c), FIG. 1C, and FIG. 1D, and either of the gating unit G3 and the gating unit G4 of the NC in FIG. 1C may be switch circuits.

Optionally, a first terminal of a gating unit may be connected to a CPU or a first terminal of a gating unit of an NC using a bus. The bus may be a QPI bus, an inter-integrated circuit ($I^2C$) bus, or another type of bus.

Optionally, a line (for example, the first line between the second terminal 12 of the gating unit G1 and the second terminal 22 of the gating unit G2 in the interconnection system, or the second line between the second terminal 32 of the gating unit G3 and the second terminal 42 of the gating unit G2 in the NC shown in FIG. 1C) may be a circuit that has a signal transmission capability. Optionally, the line may be a bus, for example, a QPI bus. For example, when the CPU 1 establishes a bus connection to the CPU 2 based on the QPI protocol, an electrical signal is transmitted using the QPI bus, and the electrical signal carries data that complies with the QPI protocol.

Optionally, in the interconnection system shown in FIG. 1A, FIG. 1B(a), FIG. 1B(b), FIG. 1B(c), FIG. 1C, and FIG. 1D, the second terminal 12 of the gating unit G1 and the second terminal 22 of the gating unit G2 may be a same terminal, such that the first line between the second terminal 12 and the second terminal 22 can be omitted. Similarly, in the NC shown in FIG. 1C, the second terminal 32 of the gating unit G3 and the second terminal 42 of the gating unit G4 may be a same terminal, such that the second line between the second terminal 32 and the second terminal 42 can be omitted.

Figure 1E:
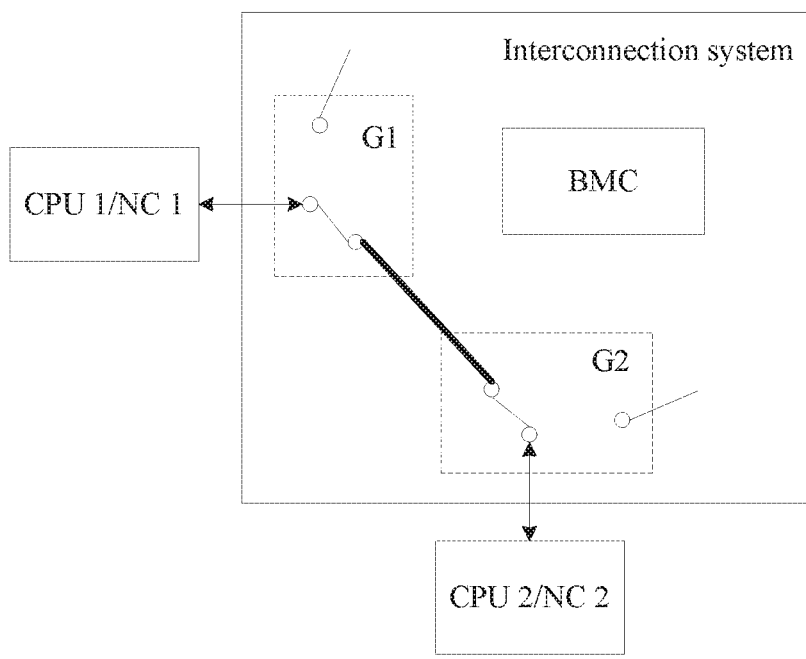
FIG. 1E is a schematic structural diagram of an interconnection system according to an embodiment of the present application.

FIG. 1E is an implementation structure of an interconnection system (as shown in FIG. 1A, FIG. 1B(a), FIG. 1B(b), FIG. 1B(c), FIG. 1C, and FIG. 1D). A baseboard management controller (BMC) in FIG. 1E is configured to control a status of a gating unit in the interconnection system.

The BMC is also referred to as a microcontroller on a mainboard. The BMC may diagnose and manage hardware in a computer device, for example, detect whether a power supply and a fan in the computer device work normally, and detect whether a memory is available.

In an embodiment of this application, in addition to an existing function, the BMC has a function of controlling a status of a gating unit in the interconnection system. The function of controlling a status of a gating unit may be implemented using code or a program running in the BMC, or may be implemented using an additional hardware component such as an application-specific integrated circuit (ASIC), a switch, or a selector. In this way, the BMC may control each gating unit in the interconnection system, for example, may set the gating unit G1 to the first state or the third state, or may set the gating unit G2 to the first state or the third state. Optionally, a program for controlling a gating unit may be added to the BMC.

Optionally, in an embodiment of this application, the BMC does not have a data forwarding function similar to that of the NC, and data exchanged between the CPU 1 and the CPU 2 is not forwarded by the BMC. Therefore, when the BMC controls a status of a gating unit in the interconnection system, the BMC does not set the gating units (G1 and G2) to the second state, or neither of the gating units G1 and G2 includes the third terminal connected to the BMC.

For a scenario in which the BMC controls a status of a gating unit in the interconnection system, in a process of starting a computer device, the BMC may control, according to division of a hard zone in the computer device, the gating unit to establish a connection between a plurality of CPUs included in the hard zone.

It should be noted that the function of controlling the gating units G1 and G2 may alternatively be set on another component in the computer device, such that the other component in the computer device may replace the BMC shown in FIG. 1E to control a status of a gating unit in the interconnection system.

Figure 1F:
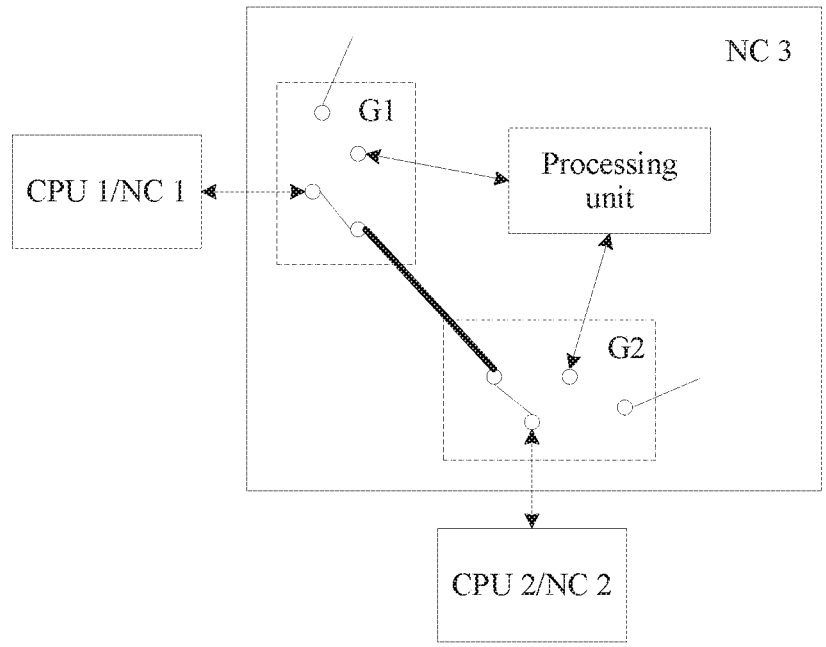
FIG. 1F is a schematic structural diagram of an interconnection system according to an embodiment of the present application.

FIG. 1F is an implementation structure of an interconnection system (as shown in FIG. 1A, FIG. 1B(a), FIG. 1B(b), FIG. 1B(c), FIG. 1C, and FIG. 1D). FIG. 1F provides an NC 3, and the NC 3 is configured to implement the interconnection system.

The NC 3 includes a processing unit, a gating unit G1, a gating unit G2, and a first line.

In addition, in this embodiment of the present application, a function of an interconnection controller is added to the processing unit of the NC 3. The processing unit of the NC 3 is used to implement an interconnection controller of the interconnection system. The processing unit of the NC 3 may set the gating units G1 and G2 to a state, for example, set the gating unit G1 to any one of the first state, the second state, or the third state. Optionally, a program for controlling a gating unit may be added to the processing unit of the NC 3 to implement the function of setting the gating units G1 and G2 to a state.

The processing unit of the NC 3 has a data forwarding function. For example, a first terminal of the gating unit G1 is connected to a CPU 1, and a first terminal of the gating unit G2 is connected to a CPU 2. When both the gating unit G1 and the gating unit G2 are set to the second state, the processing unit of the NC 3 may forward data exchanged between the CPU 1 and the CPU 2.

In this way, if the CPU 1 and the CPU 2 belong to different nodes, when both the gating unit G1 and the gating unit G2 are set to the second state, the data exchanged between the CPU 1 and the CPU 2 may be forwarded using the processing unit. In addition, if the CPU 1 and the CPU 2 belong to a same hard zone, when both the gating unit G1 and the gating unit G2 are set to the first state, the data exchanged between the CPU 1 and the CPU 2 may be directly transmitted through a line.

It should be noted that in FIG. 1F, an NC 1 and an NC 2 include a same architecture as that of the NC 3, and an operating principle of the NC 1 and the NC 2 is also the same as that of the NC 3. In this way, a connection between the two CPUs (the CPU 1 and the CPU 2) may be established across gating units of the NC 1, the gating units of the NC 3, and gating units of the NC 2. It should be noted that the connection does not pass through a processing unit of the NC 1, a processing unit of the NC 2, and the processing unit of the NC 3. Therefore, the data exchanged between the CPU 1 and the CPU 2 does not need to be forwarded by the processing unit of the NC 1, the processing unit of the NC 2, or the processing unit of the NC 3.

In this embodiment of this application, a computer device may be a server. The server includes at least one node. If the server includes a plurality of nodes, the plurality of nodes are independent of each other. For example, a blade server includes a plurality of blades, and each blade independently serves as a node. The blade herein may also be referred to as a server unit, a board computer, or a system board.

In this embodiment of this application, a node includes at least two CPUs, and each CPU is connected to at least one another CPU in the node. Optionally, the node includes an even quantity of CPUs. Optionally, a plurality of CPUs in a same node may be connected using a QPI bus. Optionally, CPUs in different nodes may be connected using an NC. Optionally, the node may further include at least one NC, and the node may exchange data with a CPU in another node in the server using the NC.

Optionally, a hard zone in the server may include one or more nodes. If a same hard zone includes a plurality of nodes, CPUs inside each node may be connected using a QPI bus, and a plurality of CPUs in different nodes may be connected using an NC. For example, it is assumed that the server includes a hard zone 1 and a hard zone 2; the hard zone 1 includes a node 1, a node 2, and a node 3; the node 1 includes a CPU 11, a CPU 12, and a CPU 13; the node 2 includes a CPU 21, a CPU 22, and a CPU 23; and the node 3 includes a CPU 31, a CPU 32, and a CPU 33. The CPU 11 and the CPU 12 may be connected using a QPI bus, but the CPU 11 and the CPU 21 need to be connected using an NC. A plurality of CPUs in a same hard zone may share a resource (for example, a memory) of the hard zone. Data cannot be exchanged between CPUs belonging to different hard zones. Resources belonging to different hard zones are mutually isolated, for example, a CPU belonging to a hard zone cannot exchange data with a CPU belonging to another hard zone, and cannot access a resource of another hard zone. For example, the CPU 11, the CPU 12, the CPU 13, the CPU 21, the CPU 22, the CPU 23, the CPU 31, the CPU 32, and the CPU 33 in the hard zone 1 may share a resource (for example, a memory) of the hard zone 1. However, a CPU in the hard zone 1 cannot share a resource with a CPU in a hard zone 2, the CPU in the hard zone 1 cannot access a resource of the hard zone 2, and the CPU in the hard zone 1 cannot exchange data with the CPU in the hard zone 2.

The following provides at least four scenarios in which an interconnection system is used in a server.

In a first scenario, data transmission bandwidth between a plurality of CPUs in a node is increased using the interconnection system.

Figure 2A:
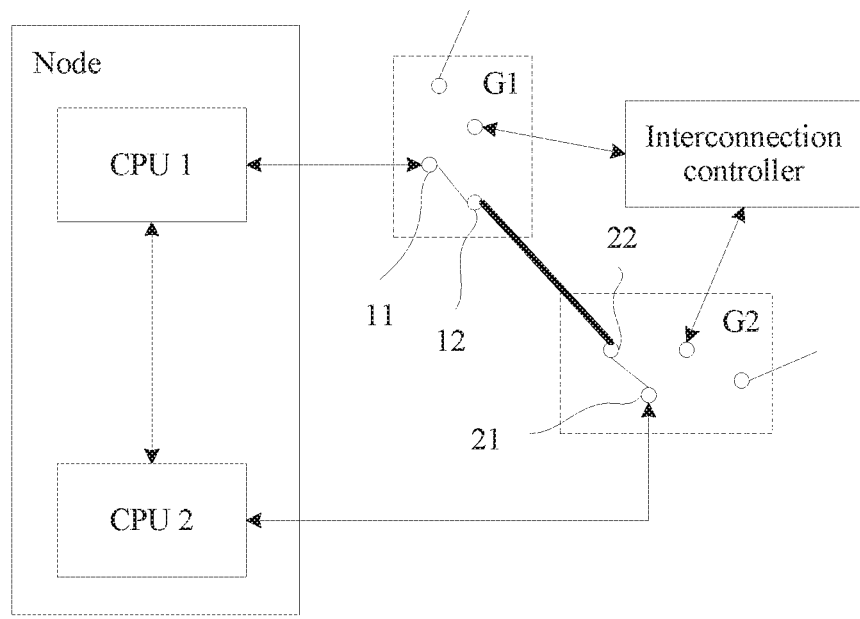
FIG. 2A is a schematic diagram of establishing a connection between CPUs in a node using an interconnection system.

A node shown in FIG. 2A is used as an example. The node includes a CPU 1 and a CPU 2. The CPU 1 and the CPU 2 are connected in the node using a QPI bus, and the CPU 1 may exchange data with the CPU 2 using the QPI bus in the node. After the interconnection system is used in this embodiment of the present application, the CPU 1 is connected to a first terminal 11 of a gating unit G1 using a QPI bus, and the CPU 2 is connected to a first terminal 21 of a gating unit G2 using a QPI bus. When the gating unit G1 and the gating unit G2 are set to the first state, the CPU 1 is connected to the CPU 2 using a first line between a second terminal 12 and a second terminal 22. A connection within the node and a connection using the first line are included between the CPU 1 and the CPU 2, such that data transmission bandwidth between the CPU 1 and the CPU 2 is increased.

Figure 2B:
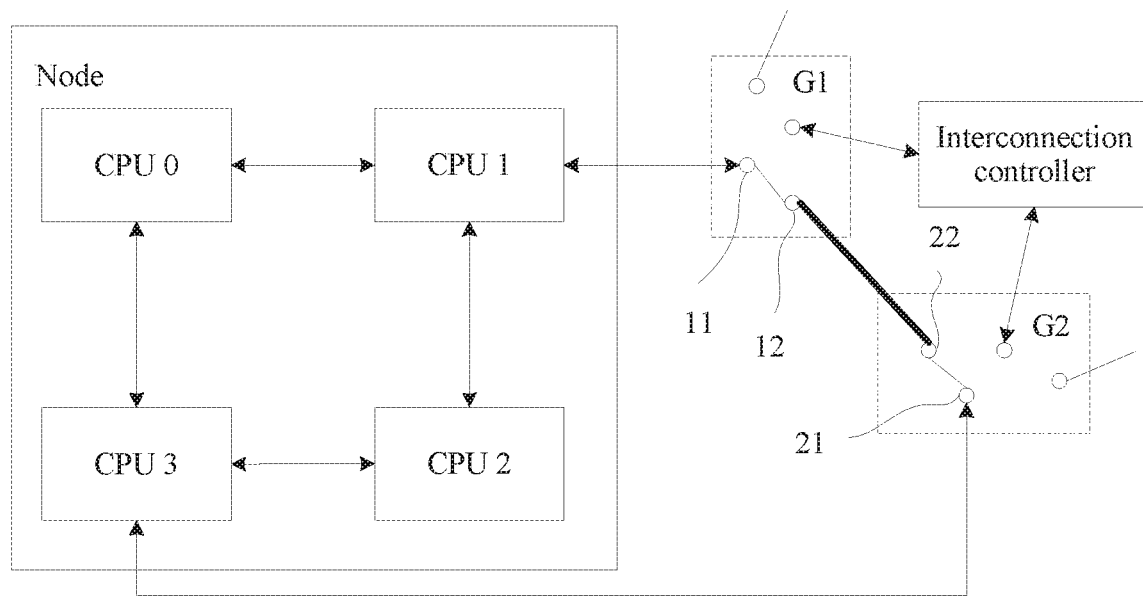
FIG. 2B is a schematic diagram of establishing a connection between CPUs in a node using an interconnection system.

A node shown in FIG. 2B is used as an example. The node includes four CPUs: a CPU 0, a CPU 1, a CPU 2, and a CPU 3. Within the node, the CPU 0 and the CPU 1, the CPU 1 and the CPU 2, the CPU 2 and the CPU 3, and the CPU 3 and the CPU 0 are separately connected using a QPI bus. Data transmitted between the CPU 1 and the CPU 3 needs to be forwarded by the CPU 0 or the CPU 2 in the node, and data transmitted between the CPU 0 and the CPU 2 needs to be forwarded by the CPU 1 or the CPU 3 in the node. In this embodiment of the present application, the CPU 1 is connected to a first terminal 11 of a gating unit G1 using a QPI bus, and the CPU 3 is connected to a first terminal 21 of a gating unit G2 using a QPI bus. When the gating unit G1 and the gating unit G2 are set to the first state, the CPU 1 may be connected to the CPU 3 using a first line between a second terminal 12 and a second terminal 22, and the CPU 1 may exchange data with the CPU 3 using the first line instead of the QPI bus in the node or an interconnection controller outside the node. Because the CPU 1 may exchange data with the CPU 3 by means of forwarding by the CPU 0 or the CPU 2 in the node, transmitting the data exchanged between the CPU 1 and the CPU 3 using the first line increases transmission bandwidth between the CPU 1 and the CPU 3.

Similarly, a connection between the CPU 0 and the CPU 2 may alternatively be established using another two gating units and another line, such that transmission bandwidth between the CPU 0 and the CPU 2 may be increased. When a connection within the node and a direct data transmission connection are included between every two CPUs in the CPU 1, the CPU 2, the CPU 3 and the CPU 0, full interconnection of the four CPUs in the node increases bandwidth between every two CPUs.

In a second scenario, a connection between CPUs in different nodes is implemented using the interconnection system.

Figure 3:
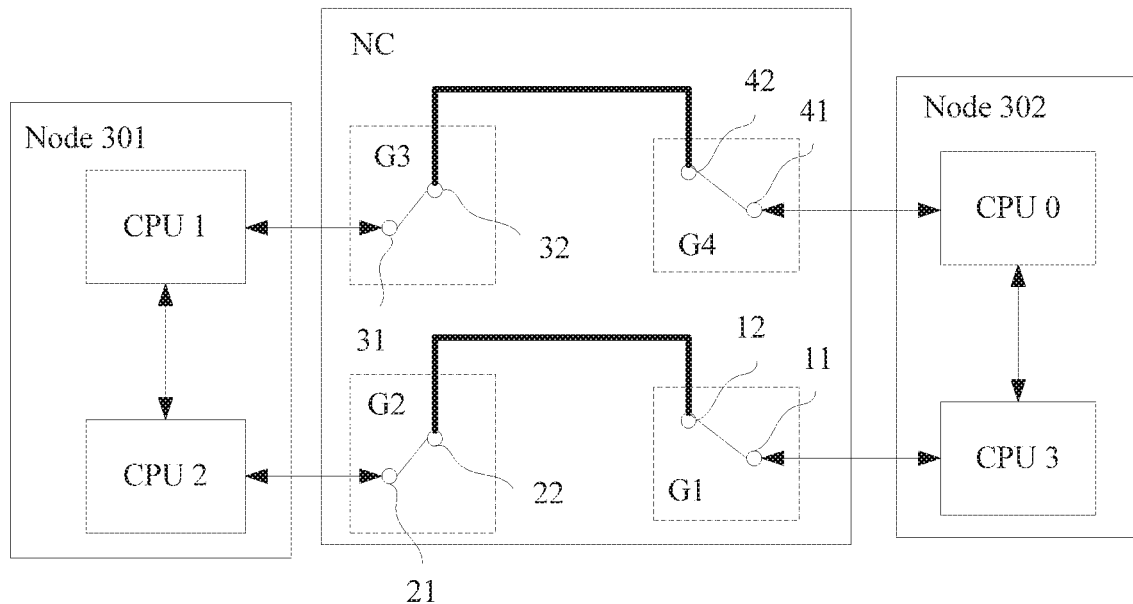
FIG. 3 is a schematic diagram of establishing a connection between CPUs across nodes using an interconnection system.

A node 301 and a node 302 shown in FIG. 3 are used as an example. The node 301 includes a CPU 1 and a CPU 2, and the node 302 includes a CPU 0 and a CPU 3. The CPU 1 and the CPU 2 in the node 301 may be connected using a QPI bus. The CPU 0 and the CPU 3 in the node 302 may be connected using a QPI bus. An NC is connected between the node 301 and the node 302, where the NC includes gating units G1, G2, G3, and G4. Statuses of the four gating units (the gating units G1, G2, G3, and G4) may be controlled by a processing unit (not shown in FIG. 3) in the NC.

The CPU 3 is connected to a first terminal 11 of the gating unit G1 using a QPI bus, and the CPU 2 is connected to a first terminal 21 of the gating unit G2 using a QPI bus. When both the gating unit G1 and the gating unit G2 are set to the first state, the CPU 3 may be connected to the CPU 2 using a line between a second terminal 12 of the gating unit G1 and a second terminal 22 of the gating unit G2, such that the CPU 3 may directly exchange data with the CPU 2 using the line. Similar to the principle of establishing a connection between the CPU 3 and the CPU 2, the CPU 0 may establish a connection to the CPU 1 using a line between a second terminal 32 of the gating unit G3 and a second terminal 42 of the gating unit G4. When the node 301 and the node 302 are located in a same hard zone and all the four gating units G1, G2, G3, and G4 are set to the first state, a connection may be established between the CPU 1 of the node 301 and the CPU 0 of the node 302, and a connection may be established between the CPU 2 of the node 301 and the CPU 3 of the node 302.

Optionally, the gating units G1, G2, G3, and G4 between the node 301 and the node 302 may belong to different NCs. For example, a CPU in the node 301 is connected to a CPU in the node 302 using two node controllers NC 1 and NC 2; and the NC 1 includes the gating units G1 and G2, and the NC 2 includes the gating units G3 and G4.

In a third scenario, a connection is established between two CPUs using at least two interconnection systems. The two CPUs may belong to a same node or belong to different nodes.

Figure 4A:
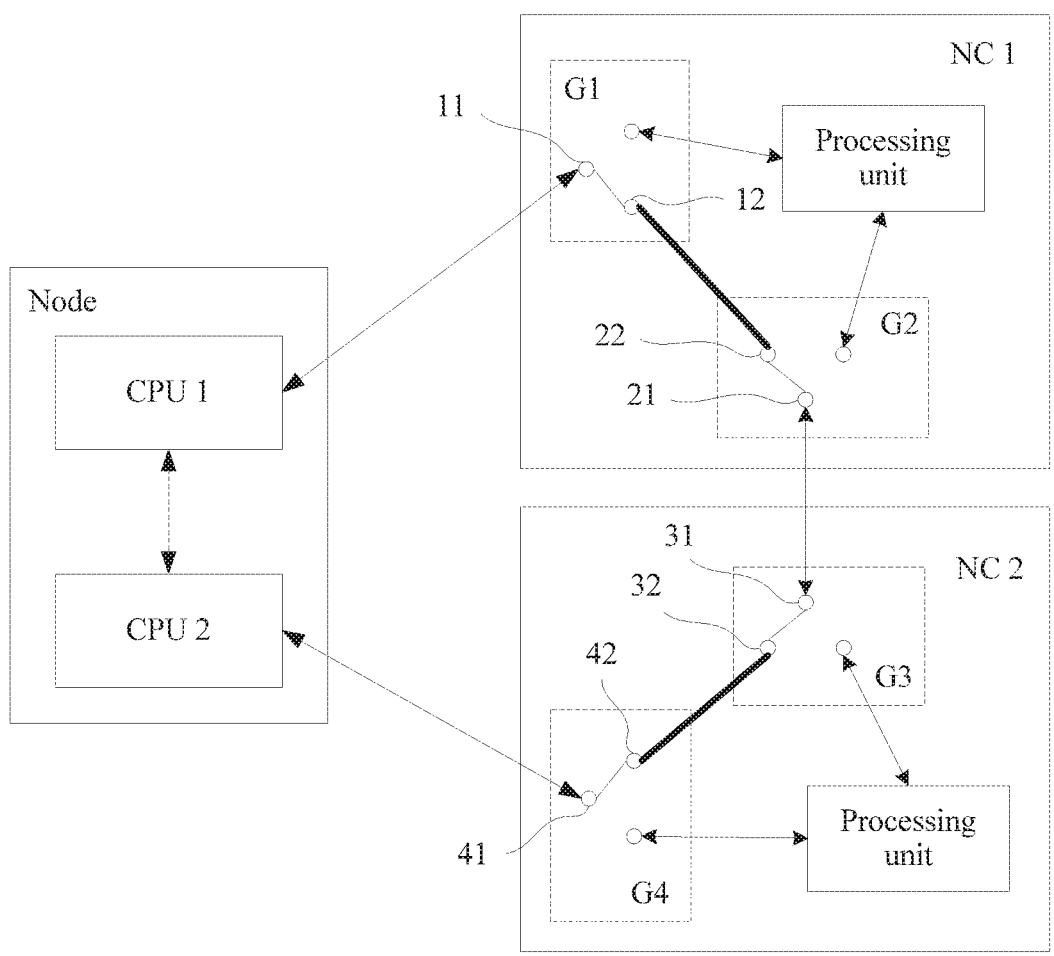
FIG. 4A is a schematic diagram of establishing a connection between CPUs in a node using two NCs.

As shown in FIG. 4A, a node includes a CPU 1 and a CPU 2. The CPU 1 and the CPU 2 are connected in the node using a QPI bus, and the CPU 1 may directly exchange data with the CPU 2. Alternatively, the CPU 1 and the CPU 2 are not directly connected using a QPI bus, and the CPU 1 exchanges data with the CPU 2 using one or more CPUs (not shown in FIG. 4A) in the node (the node to which the CPU 1 and the CPU 2 belong). The CPU 1 is connected to a first terminal 11 of a gating unit G1 of a node controller NC 1 using a QPI bus, and the CPU 2 is connected to a first terminal 41 of a gating unit G4 of a node controller NC 2 using a QPI bus. A first terminal 21 of a gating unit G2 of the node controller NC 1 is connected to a first terminal 31 of a gating unit G3 of the node controller NC 2 using a QPI bus. In the node controller NC 1, a second terminal 12 of the gating unit G1 is connected to a second terminal 22 of the gating unit G2 using a first line. In the node controller NC 2, a second terminal 32 of the gating unit G3 is connected to a second terminal 42 of the gating unit 64 using a second line. When all the gating unit 61, the gating unit 62, the gating unit 63, and the gating unit G4 are in the first state, the CPU 1 is connected to the CPU 2. Optionally, one or more of the node controllers NC 1 and NC 2 in FIG. 4A may be replaced with another interconnection system, such as the interconnection system implemented by a BMC, a switch, or a selector mentioned in the foregoing embodiment. Optionally, in FIG. 4B, a connection between a CPU 1 and a CPU 2 is established using two node controllers NCs (that is, an NC 1 and an NC 2). Certainly, a connection between the CPU 1 and the CPU 2 may alternatively be established using three or more NCs. An implementation principle of establishing a connection between the CPU 1 and the CPU 2 using three or more NCs is similar to an implementation principle of establishing a connection between the CPU 1 and the CPU 2 using the NC 1 and the NC 2. Details are not described herein. Certainly, at least two other interconnection systems such as the interconnection system that includes a BMC, a switch, or a selector and that is mentioned in the foregoing embodiment may be sequentially connected in series between the CPU 1 and the CPU 2, in order to implement a connection between the CPU 1 and the CPU 2. Optionally, one or more node controllers and one or more other interconnection systems such as the interconnection system that includes a BMC, a switch, or a selector and that is mentioned in the foregoing embodiment, in order to implement a connection between the CPU 1 and the CPU 2. In this embodiment of the present application, the CPU 1 and the CPU 2 are connected using the gating units 61 and G2 of the NC 1 and the gating units G3 and G4 of the NC 2. This may increase data transmission bandwidth between the CPU 1 and the CPU 2.

Figure 4B:
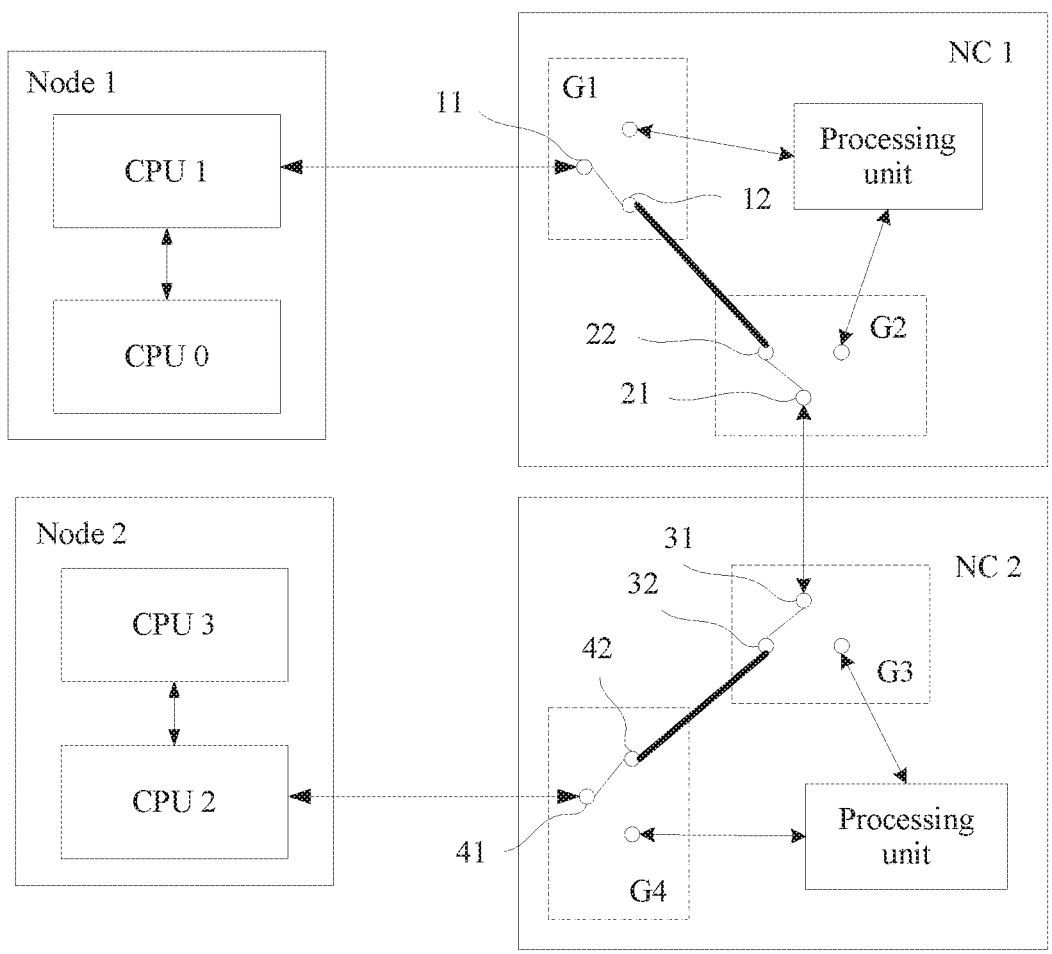
FIG. 4B is a schematic diagram of establishing a connection between CPUs across nodes using two NCs.

As shown in FIG. 4B, a node 1 includes the CPU 1 and a CPU 0, a node 2 includes the CPU 2 and a CPU 3, and the node 1 and the node 2 are connected using the node controllers NC 1 and NC 2. The CPU 1 and the CPU 0 in the node 1 are connected in the node using a QPI bus, and the CPU 1 may directly exchange data with the CPU 0. Alternatively, the CPU 1 and the CPU 0 are not directly connected using a QPI bus, and the CPU 1 exchanges data with the CPU 0 using one or more CPUs (not shown in FIG. 4B) in the node 1. The CPU 3 and the CPU 2 in the node 2 are connected in the node using a QPI bus, and the CPU 1 may directly exchange data with the CPU 2. Alternatively, the CPU 3 and the CPU 2 are not directly connected using a QPI bus, and the CPU 3 exchanges data with the CPU 2 using one or more CPUs (not shown in FIG. 4B) in the node 2. The CPU 1 is connected to a first terminal 11 of the gating unit G1 of the node controller NC 1 using a QPI bus, and the CPU 2 is connected to a first terminal 41 of the gating unit G4 of the node controller NC 2 using a QPI bus. A first terminal 21 of the gating unit (12 of the node controller NC 1 is connected to a first terminal 31 of the gating unit G3 of the node controller NC 2 using a QPI bus. In the node controller NC 1, a second terminal 12 of the gating unit G1 is connected to a second terminal 22 of the gating unit G2 using a first line. In the node controller NC 2, a second terminal 32 of the gating unit G3 is connected to a second terminal 42 of the gating unit G4 using a second line. When all the gating unit G1, the gating unit G2, the gating unit G3, and the gating unit G4 are in the first state, the CPU 1 is connected to the CPU 2.

Optionally, in FIG. 4B, a connection between a CPU 1 and a CPU 2 is established using two node controllers NCs (that is, an NC 1 and an NC 2). Certainly, a connection between the CPU 1 and the CPU 2 may alternatively be established using three or more NCs. An implementation principle of establishing a connection between the CPU 1 and the CPU 2 using three or more NCs is similar to an implementation principle of establishing a connection between the CPU 1 and the CPU 2 using the NC 1 and the NC 2. Details are not described herein. Optionally, one or more node controllers and one or more other interconnection systems such as the interconnection system that includes a BMC, a switch, or a selector in the foregoing embodiment, in order to implement a connection between the CPU 1 and the CPU 2.

Figure 4C:
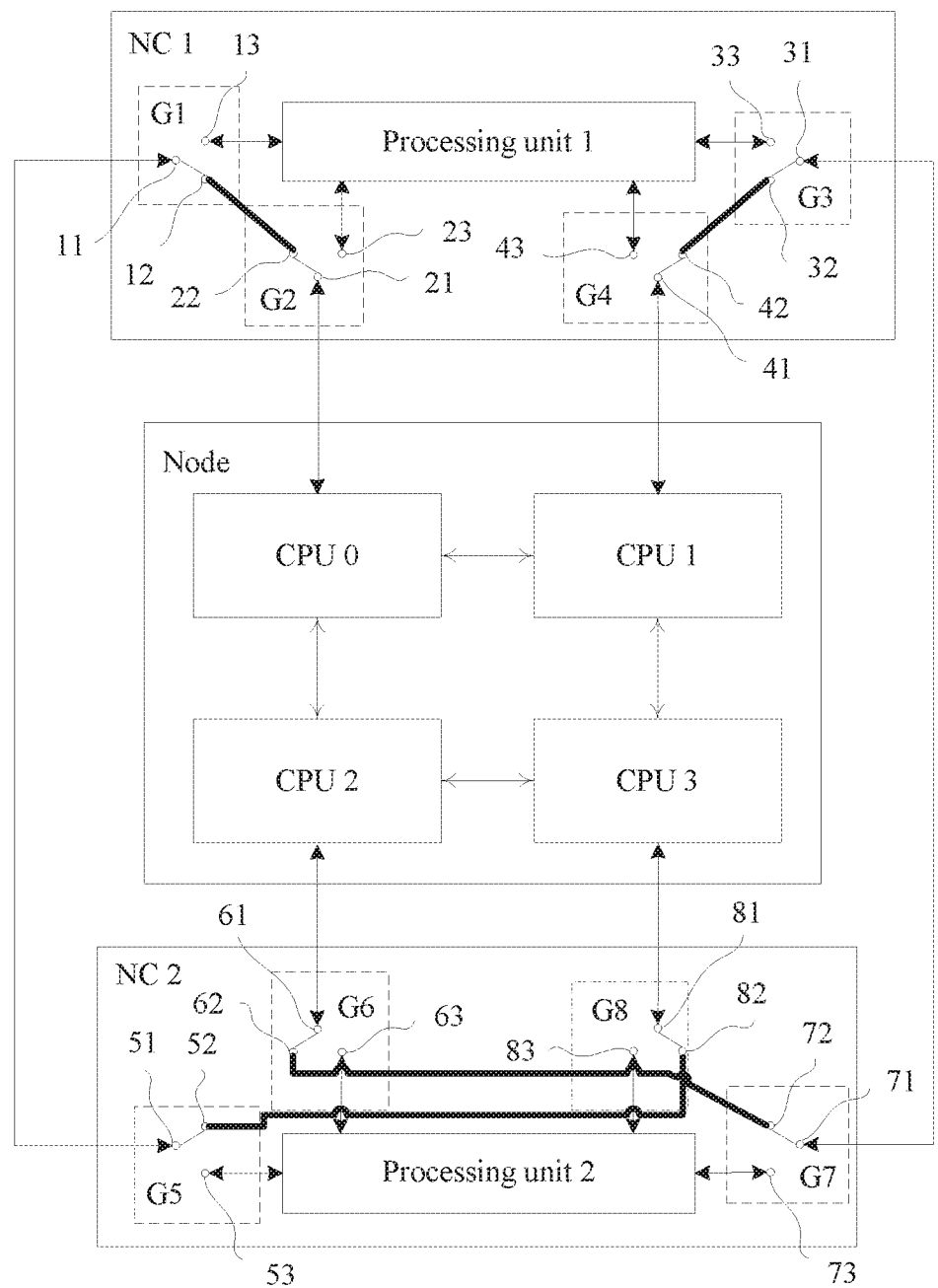
FIG. 4C is a schematic diagram of establishing full interconnection of CPUs in a node using two NCs.

In addition, full interconnection between a plurality of CPUs in a node may be further implemented using at least two NCs. As shown in FIG. 4C, a node includes a CPU 0, a CPU 1, a CPU 2, and a CPU 3. The CPU 0, the CPU 1, the CPU 2, and the CPU 3 are successively connected in the node using a QPI bus. A node controller NC 1 includes a processing unit 1 and gating units G1, G2, G3, and G4. A node controller NC 2 includes a processing unit 2 and gating units G5, G6, G7, and G8. A first terminal 11 of the gating unit G1 is connected to a first terminal 51 of the gating unit G5, a second terminal 12 of the gating unit G1 is connected to a second terminal 22 of the gating unit G2 using a line, and a third terminal 13 of the gating unit G1 is connected to the processing unit 1. A first terminal 21 of the gating unit G2 is connected to the CPU 0 in the node, and a third terminal 23 of the gating unit G2 is connected to the processing unit 1. A first terminal 31 of the gating unit G3 is connected to a first terminal 71 of the gating unit G7, a second terminal 32 of the gating unit G3 is connected to a second terminal 42 of the gating unit G4 using a line, and a third terminal 33 of the gating unit G3 is connected to the processing unit 1. A first terminal 41 of the gating unit G4 is connected to the CPU 1 in the node, and a third terminal 43 of the gating unit G4 is connected to the processing unit 1. A second terminal 52 of the gating unit G5 is connected to a second terminal 82 of the gating unit G8, and a third terminal 53 of the gating unit G5 is connected to the processing unit 2. A first terminal 61 of the gating unit G6 is connected to the CPU 2, a second terminal 62 of the gating unit G6 is connected to a second terminal 72 of the gating unit G7, and a third terminal 63 of the gating unit G6 is connected to the processing unit 2. A third terminal 73 of the gating unit G7 is connected to the processing unit 2. A first terminal 81 of the gating unit G8 is connected to the CPU 3, and a third terminal 83 of the gating unit G8 is connected to the processing unit 2.

When the gating unit G1 and the gating unit G2 are set to the first state by the processing unit 1 of the NC 1, and the gating unit G5 and the gating unit G8 are set to the first state by the processing unit 2 of the NC 2, the first terminal 11 and the second terminal 12 that are of the gating unit G1 are connected, the first terminal 21 and the second terminal 22 that are of the gating unit G2 are connected, the first terminal 51 and the second terminal 52 that are of the gating unit G5 are connected, and the first terminal 81 and the second terminal 82 that are of the gating unit G8 are connected. In this way, the CPU 0 may be connected to the CPU 3 using the line between the second terminal 12 of the gating unit G1 and the second terminal 22 of the gating unit G2, and a line between the second terminal 52 of the gating unit G5 and the second terminal 82 of the gating unit G8. Similarly, when the gating unit G3 and the gating unit G4 are set to the first state by the processing unit 1 of the NC 1, and the gating unit G6 and the gating unit G7 are set to the first state by the processing unit 2 of the NC 2, the first terminal 31 and the second terminal 32 that are of the gating unit G3 are connected, the first terminal 41 and the second terminal 42 that are of the gating unit G4 are connected, the first terminal 61 and the second terminal 62 that are of the gating unit G6 are connected, and the first terminal 71 and the second terminal 72 that are of the gating unit G7 are connected. In this way, the CPU 1 may be connected to the CPU 2 using the line between the second terminal 32 of the gating unit G3 and the second terminal 42 of the gating unit G4, and a line between the second terminal 62 of the gating unit G6 and the second terminal 72 of the gating unit G7. As a result, every two CPUs in the CPU 0, the CPU 1, the CPU 2, and the CPU 4 are connected, thereby implementing full interconnection of the four CPUs. Optionally, one or more other interconnection systems such as the interconnection system that includes a BMC, a switch, or a selector in the foregoing embodiment may be used to replace one or more of the node controllers NC 1 and NC 2 in FIG. 4C.

In a fourth scenario, at least one interconnection system is used to support different hard zones.

Figure 5A:
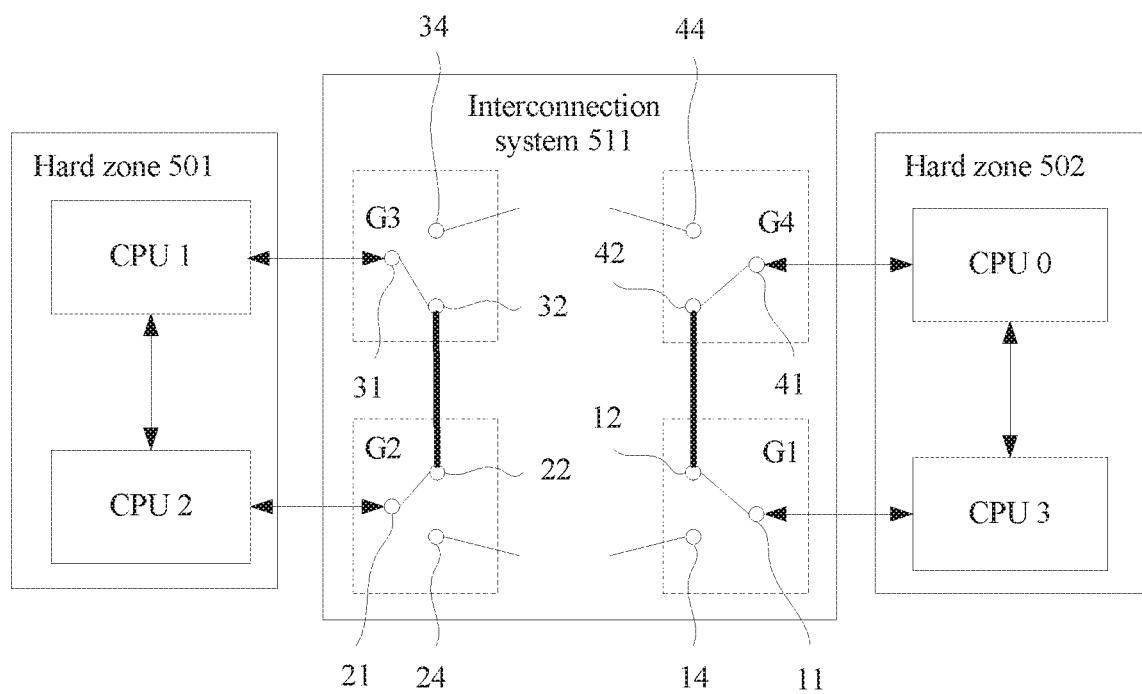
FIG. 5A is a schematic diagram of implementing a hard zone including two CPUs using an interconnection system.

As shown in FIG. 5A, a server includes a hard zone 501 and a hard zone 502. The hard zone 501 includes a CPU 1 and a CPU 2. The hard zone 502 includes a CPU 0 and a CPU 3. The CPU 1 and the CPU 2 are in a same node (for example, a node 1) and are connected using a QPI bus. The CPU 0 and the CPU 3 are in another node (for example, a node 2) and are connected using a. QPI bus. An interconnection system 511 includes gating units G1, G2, G3, and G4. The CPU 1 is connected to a first terminal 31 of the gating unit G3, a second terminal 32 of the gating unit G3 is connected to a second terminal 22 of the gating unit G2 using a line, and a first terminal 21 of the gating unit G2 is connected to the CPU 2. The CPU 0 is connected to a first terminal 41 of the gating unit G4, a second terminal 42 of the gating unit G4 is connected to a second terminal 12 of the gating unit G1 using a line, and a first terminal 11 of the gating unit G1 is connected to the CPU 3.

When both the gating unit G2 and the gating unit G3 are set to the first state, the first terminal 31 and the second terminal 32 that are of the gating unit G3 are connected, and the first terminal 21 and the second terminal 22 that are of the gating unit G2 are connected. In this way, the CPU 1 is connected to the CPU 2 using the line between the second terminal 32 of the gating unit G3 and the second terminal 22 of the gating unit G2. Similarly, if both the gating unit and the gating unit G4 are set to the first state, the first terminal 41 and the second terminal 42 that are of the gating unit G4 are connected, and the first terminal 11 and the second terminal 12 that are of the gating unit G1 are connected. In this way, the CPU 0 is connected to the CPU 3 using the line between the second terminal 42 of the gating unit G4 and the second terminal 11 of the gating unit G1. In this way, the CPU 1 is not connected to the CPU 0 or the CPU 3, and the CPU 2 is not connected to the CPU 0 or the CPU 3 either, such that the hard zone 501 is isolated from the hard zone 502. In addition, data transmission bandwidth between the CPU 1 and the CPU 2 is increased using a line inside the hard zone 501, and data transmission bandwidth between the CPU 3 and the CPU 0 is increased using another line inside the hard zone 502.

In an embodiment of this application, in the interconnection system 511 in FIG. 5A, when the gating unit G2 and the gating unit G3 are set to the third state, the first terminal 21 and a fourth terminal 24 that are of the gating unit G2 are connected, and the first terminal 31 and a fourth terminal 34 that are of the gating unit G3 are connected. In this case, the CPU 1 is not connected to the CPU 2 using the line connected between the second terminal 32 of the gating unit G3 and the second terminal 22 of the gating unit G2, such that the data transmission bandwidth between the CPU 1 and the CPU 2 is not increased using the line. In addition, the CPU 1 is not connected to the CPU 0 or the CPU 3, and the CPU 2 is not connected to the CPU 0 or the CPU 3 either, such that the hard zone 501 is isolated from the hard zone 502.

Similarly, in the interconnection system 511 in FIG. 5A, when the gating unit G1 and the gating unit G4 are set to the third state, the first terminal 11 and a fourth terminal 14 that are of the gating unit G1 are connected, and the first terminal 41 and a fourth terminal 44 that are of the gating unit G4 are connected. In this case, the CPU 0 is not connected to the CPU 3 using the line connected between the second terminal 42 of the gating unit 4 and the second terminal 12 of the gating unit G1, such that the data transmission bandwidth between the CPU 0 and the CPU 3 is not increased using the line. In addition, the CPU 0 is not connected to the CPU 1 or the CPU 2 and the CPU 3 is not connected to the CPU 1 or the CPU 2 either, such that the hard zone 501 is isolated from the hard zone 502.

Optionally, the interconnection system 511 shown in FIG. 5A may be a node controller NC or the interconnection system that includes a BMC, a switch, or a selector and that is mentioned in the foregoing embodiment.

Figure 5B:
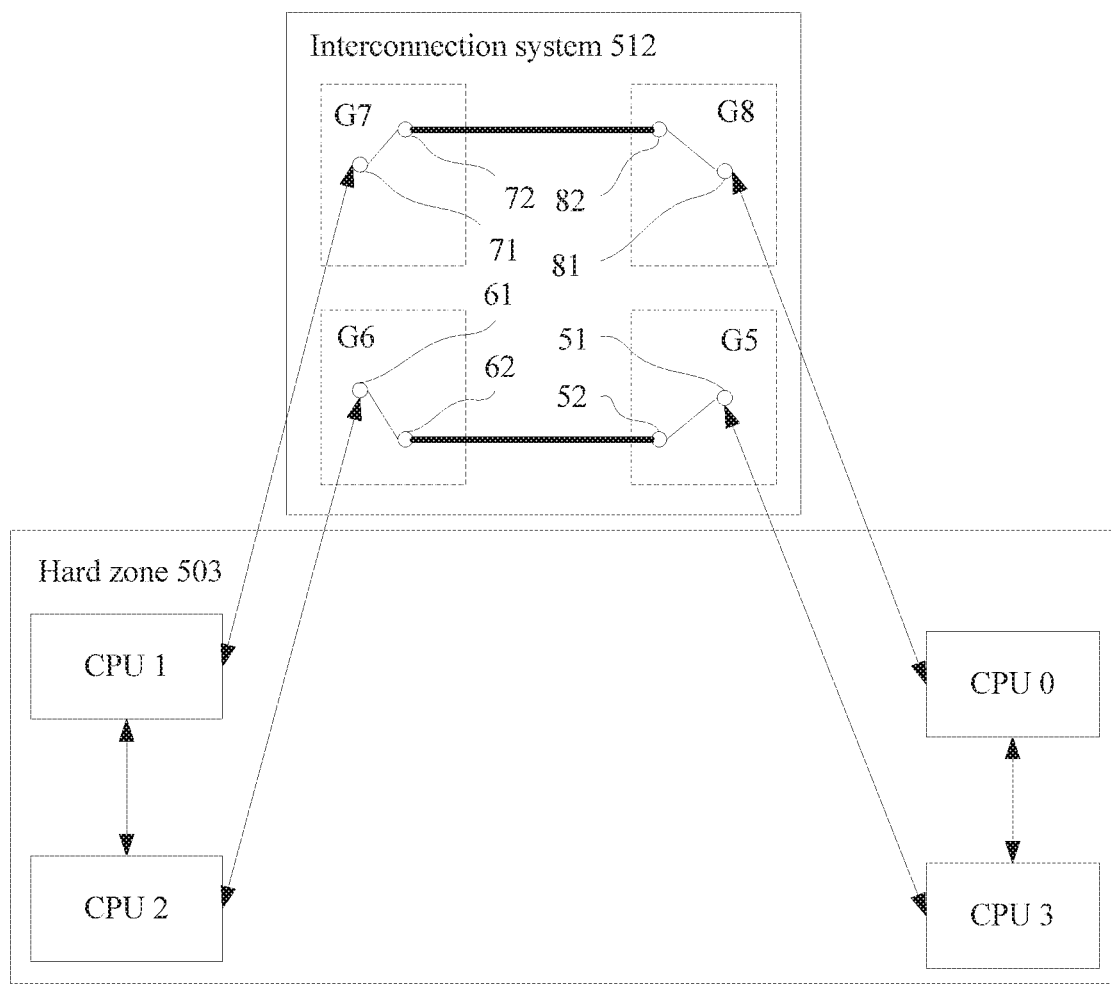
FIG. 5B is a schematic diagram of implementing a hard zone including four CPUs using an interconnection system.

As shown in FIG. 5B, a server includes a hard zone 503. The hard zone 503 includes central processing units CPU 0, CPU 1. CPU 2, and CPU 3. The CPU 1 is connected to the CPU 2, and the CPU 0 is connected to the CPU 3. An interconnection system 512 includes gating units G5, G6, G7, and G8. A first terminal 51 of the gating unit G5 is connected to the CPU 3. A second terminal 52 of the gating unit G5 is connected to a second terminal 62 of the gating unit G6 using a line. A first terminal 61 of the gating unit G6 is connected to the CPU 2. A first terminal 71 of the gating unit G7 is connected to the CPU 1. A first terminal 81 of the gating unit G8 is connected to the CPU 0. A second terminal 72 of the gating unit G7 is connected to a second terminal 82 of the gating unit G8 using a line.

When the CPU 0 and the CPU 1 are located in a same node, and both the gating unit G7 and the gating unit G8 are set to the first state, the first terminal 71 and the second terminal 72 that are of the gating unit G7 are connected, and the first terminal 81 and the second terminal 82 that are of the gating unit G8 are connected. In this way, the CPU 1 is connected to the CPU 0 using the line connected between the second terminal 72 of the gating unit G7 and the second terminal 82 of the gating unit G8. Similarly, when the CPU 2 and the CPU 3 are located in a same node, and both the gating unit G5 and the gating unit G6 are set to the first state, the first terminal 51 and the second terminal 52 that are of the gating unit G5 are connected, and the first terminal 61 and the second terminal 62 that are of the gating unit G6 are connected. In this way, the CPU 3 is connected to the CPU 2 using the line connected between the second terminal 52 of the gating unit G5 and the second terminal 62 of the gating unit G6. The interconnection system 512 herein may be a node controller NC or the interconnection system that includes a BMC, a switch, or a selector and that is mentioned in the foregoing embodiment. When the CPU 0 and the CPU 1 are located in different nodes, the interconnection system 512 may be a node controller NC. When both the gating unit G7 and the gating unit G8 are set to the first state, the first terminal 71 and the second terminal 72 that are of the gating unit G7 are connected, and the first terminal 81 and the second terminal 82 that are of the gating unit G8 are connected. In this way, the CPU 1 is connected to the CPU 0 using the line connected between the second terminal 72 of the gating unit G7 and the second terminal 82 of the gating unit G8. Similarly, when the CPU 2 and the CPU 3 are located in different nodes, the interconnection system 512 limy be a node controller NC. When both the gating unit G5 and the gating unit G6 are set to the first state, the first terminal 51 and the second terminal 52 that are of the gating unit G5 are connected, and the first terminal 61 and the second terminal 62 that are of the gating unit G6 are connected. In this way, the CPU 3 is connected to the CPU 2 using the line connected between the second terminal 52 of the gating unit G5 and the second terminal 62 of the gating unit G6.

Optionally, the interconnection system 512 shown in FIG. 5B may be a node controller NC or the interconnection system that includes a BMC, a switch, or a selector and that is mentioned in the foregoing embodiment.

Figure 5C:
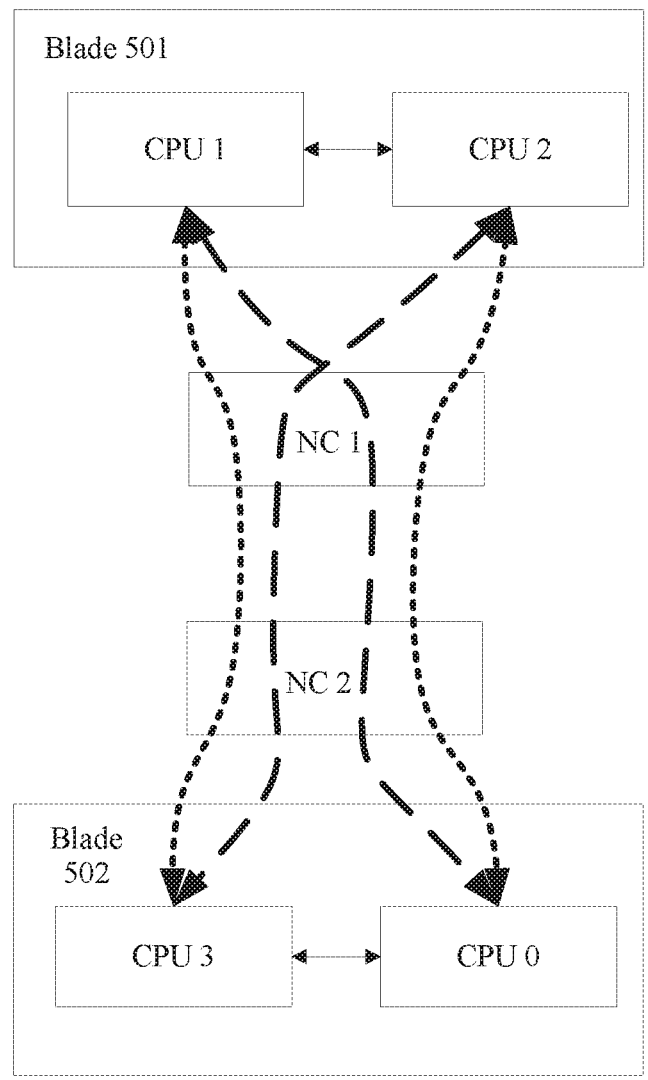
FIG. 5C is a schematic diagram of establishing full interconnection of CPUs across blades using two NCs.

A hard zone (not shown in FIG. 5C) across nodes is implemented using two NCs (that is, two interconnection systems) in FIG. 5C. As shown in FIG. 5C, a blade 501 and a blade 502 belong to different nodes in a blade server. A CPU 1 and a CPU 2 belong to the blade 501, and the CPU 1 is connected to the CPU 2 in the blade 501. A CPU 0 and a CPU 3 belong to the blade 502, and the CPU 0 is connected to the CPU 3 in the blade 502. In addition, the CPU 1 is connected to the CPU 0 using a plurality of gating units and a plurality of lines in an NC 1 and an NC 2, the CPU 1 is connected to the CPU 3 using a plurality of gating units and a plurality of lines in the NC 1 and the NC 2, the CPU 2 is connected to the CPU 0 using a plurality of gating units and a plurality of lines in the NC 1 and the NC 2, and the CPU 2 is connected to the CPU 3 using a plurality of gating units and a plurality of lines in the NC 1 and the NC 2. An establishment manner of establishing a connection between two CPUs (for example, the CPU 1 and the CPU 0, the CPU 1 and the CPU 3, the CPU 2 and the CPU 0, or the CPU 2 and the CPU 3) is similar to the manner of establishing a connection between the CPU 1 and the CPU 2 in FIG. 4B, and details are not described herein. In this way, every two of the four CPUs (the CPU 0, the CPU 1, the CPU 2, and the CPU 3) are connected. This not only supports a hard zone 503 including four CPUs, but also implements full interconnection of the four CPUs in the hard zone 503.

It should be noted that, when different hard zones are supported, the interconnection systems shown in FIG. 1D, FIG. 1E, and FIG. 1F implement or add a connection between two CPUs in a hard zone by controlling a status of a gating unit.

It can be learned that, in this embodiment of the present application, a quantity of connections between a plurality of CPUs may be controlled using an interconnection system.

Figure 6A:
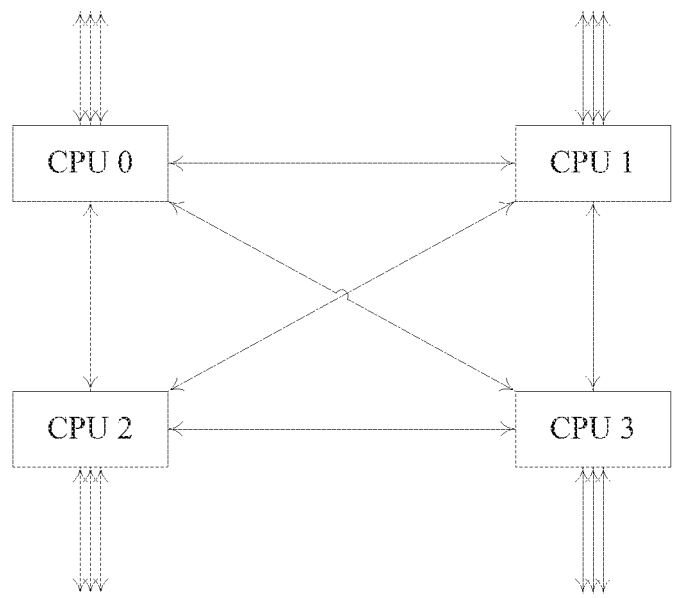
FIG. 6A is a schematic diagram of a QPI interface of a CPU in a node.
Figure 6B:
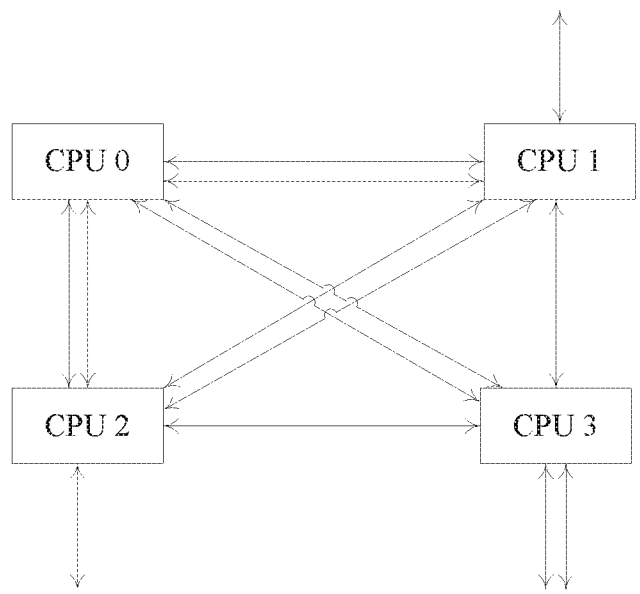
FIG. 6B is a schematic diagram of a QPI interface of a CPU in a node.
Figure 6C:
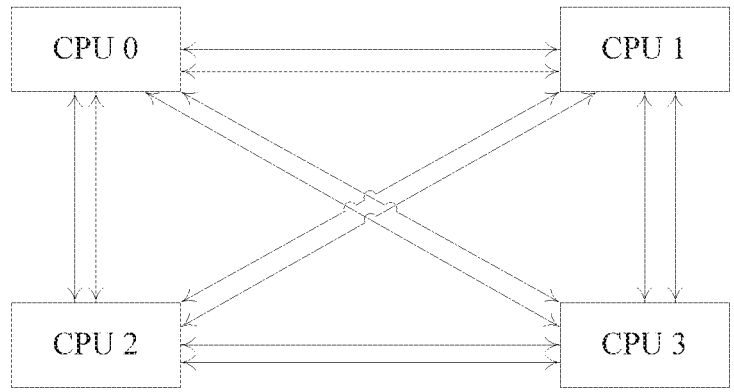
FIG. 6C is a schematic diagram of a QPI interface of a CPU in a node.

As shown in FIG. 6A, a node includes four CPUs: a CPU 0, a CPU 1, a CPU 2, and a CPU 3. Each CPU has six QPI interfaces. The CPU 0 is used as an example. Three QPI interfaces of the CPU 0 are respectively connected to the CPU 1, the CPU 2, and the CPU 3. Remaining three QPI interfaces (hereinafter referred to as a first QPI interface) of the CPU 0 are configured to connect to a node controller NC (not shown in FIG. 6A), such that the CPU 0 can implement data transmission between the CPU 0 and a CPU in another node using the first QPI interface and the NC connected to the first QPI interface. Compared with other approaches, the node controller NC provided in this embodiment of the present application includes a plurality of gating units and a plurality of lines. A connection between every two of the four CPUs may be added using a first QPI interface of a CPU and a plurality of gating units and at least one line that are in an NC. For example, as shown in FIG. 6B, when the CPU 0 is used as a primary CPU, the CPU 0 separately exchanges much data with the CPU 1, the CPU 2, and the CPU 3, but little data is exchanged between every two of the CPU 1, the CPU 2, and the CPU 3. Therefore, a connection between the CPU 0 and each of the CPU 1, the CPU 2, and the CPU 3 may be established using the first QPI interface of the CPU 0 and a plurality of gating units and at least one line that are in the NC connected to the first QPI interface, in order to increase data transmission bandwidth between the CPU 0 and each of the CPU 1, the CPU 2, and the CPU 3. For example, as shown in FIG. 6C, when much data is exchanged between every two of the four CPUs, a connection between each CPU and another CPU may be established using first QPI interfaces of all the CPUs and a plurality of gating units and at least one line that are in NCs connected to the first QPI interfaces, in order to add a connection between every two of the four CPUs. Conversely, when little data is exchanged between two CPUs, an added connection may be disconnected using a gating unit of an NC. In this way, a quantity of connections between a plurality of CPUs may be adjusted according to a volume of data exchanged between the plurality of CPUs.

Method Embodiment

According to an interconnection control method provided in an embodiment of this application, a connection between a plurality of CPUs may be established using at least one interconnection system. The interconnection system may be the architecture shown in FIG. 1A, FIG. 1B(a), FIG. 1B(b), FIG. 19(c), FIG. 1C, or FIG. 1D. For example, the interconnection system may be the architecture shown in FIG. 1E or FIG. 1F. Optionally, the interconnection control method is applicable to a plurality of interconnection systems. All the plurality of interconnection systems may be the interconnection system shown in FIG. 1E or FIG. 1F, or the plurality of interconnection systems may include the interconnection system shown in FIG. 1E and the interconnection system shown in FIG. 1F. Each interconnection system includes an interconnection controller and a plurality of gating units.

The interconnection control method is applied to I gating unit groups, where I is greater than or equal to 1. Each of the I gating unit groups is configured to establish a connection between two CPUs. The two CPUs may belong to a same node or belong to different nodes. In this embodiment of the present application, the two CPUs form one CPU group.

Each gating unit group includes at least two gating units. The at least two gating units may belong to a same interconnection system, and an interconnection controller of the interconnection system sets the gating units to a status. Alternatively, the at least two gating units may belong to at least two interconnection systems, and an interconnection controller of each interconnection system controls some of the at least two gating units (for example, sets a gating unit to a status).

All the gating units of the gating unit group are connected in series between two CPUs (belonging to one CPU group). In some aspects, the gating unit group includes an even quantity of gating units. For an implementation in which all the gating units of the gating unit group are connected in series between two CPUs, refer to the connection manner in which a gating unit group (a gating unit G1 and a gating unit G2) is connected between a CPU 1 and a CPU 2 in FIG. 1A, or refer to the connection manner in which a gating unit group (a gating unit G1, a gating unit G2, a gating unit G3, and a gating unit G4) is connected between a CPU 1 and a CPU 2 in FIG. 4A.

Optionally, if two gating units in the gating unit group are connected using two second terminals, the two second terminals are connected using a line. In this way, when all the gating units in the gating unit group are set to a first state, the gating unit group may connect two CPUs (belonging to one CPU group) using the line.

FIG. 2A and FIG. 2B are used as an example. A gating unit that is configured to establish a connection between a CPU 1 and a CPU 2 (belonging to one CPU group) includes a gating unit G1 and a gating unit G2. Therefore, the gating unit G1 and the gating unit G2 may be used as a gating unit group. A second terminal of the gating unit G1 is connected to a second terminal of the gating unit G2 using a line. Referring to the related descriptions of FIG. 2A and FIG. 2B, when the gating unit G1 and the gating unit G2 are set to the first state, the CPU 1 may be connected to the CPU 2 using the gating unit G1, the gating unit G2, and the line.

FIG. 4A and FIG. 4B are used as an example. It is assumed that a CPU 1 and a CPU 2 belong to one CPU group, and a gating unit that is configured to establish a connection between the CPU 1 and the CPU 2 includes a gating unit G1, a gating unit G2, a gating unit G3, and a gating unit G4. Therefore, the four gating units G1, G2, G3, and G4 may be used as a gating unit group. A second terminal of the gating unit G1 is connected to a second terminal of the gating unit G2 using a line. A second terminal of the gating unit G3 is connected to a second terminal of the gating unit G4 using a line. Referring to the foregoing related descriptions of FIG. 4A and FIG. 4B, when all the four gating units are set to the first state, the CPU 1 is connected to the CPU 2 using the four gating units and the two lines. In this example, all the gating units in the gating unit group are in a same interconnection system or two interconnection systems. Optionally, all the gating units in the gating unit group may belong to three or more interconnection systems.

Figure 7:
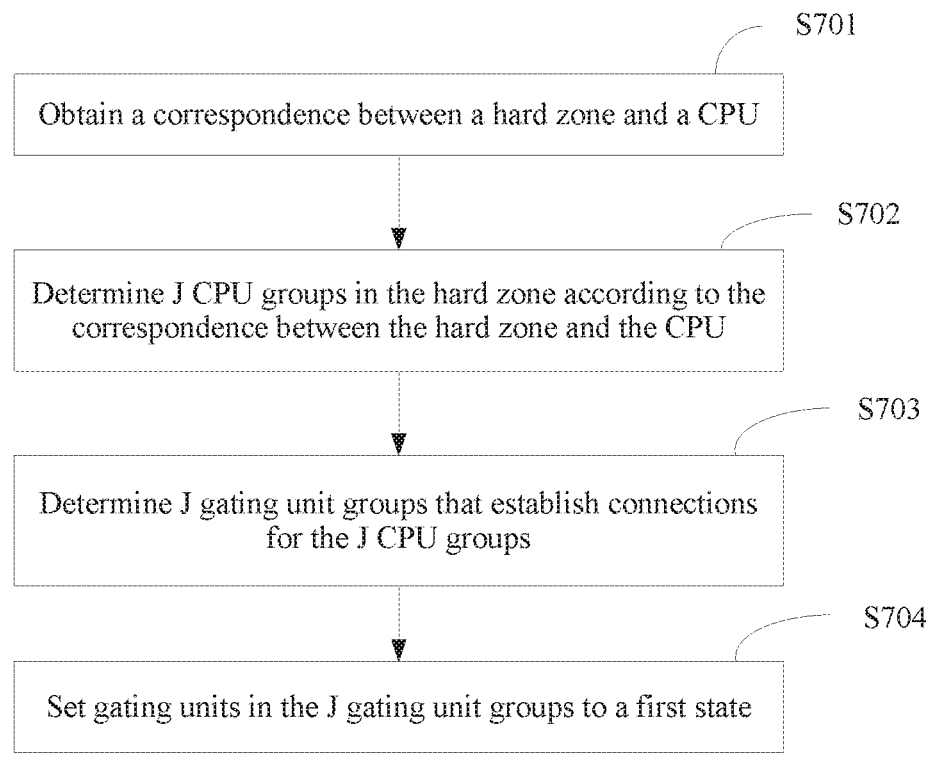
FIG. 7 is a schematic flowchart of an interconnection control method according to an embodiment of the present application.

As shown in FIG. 7, this method embodiment provides an interconnection control method to implement a connection between a plurality of CPUs in a hard zone. An execution body of the interconnection control method may be an NC or a BMC, or a chassis management controller (CMC) instructs the BMC to set a gating unit to a status, or the CMC may instruct the BMC to set a gating unit to a status using another interconnection controller (for example, an NC). Alternatively, an execution body of the interconnection control method may be an interconnection controller of an interconnection system. Alternatively, an execution body of the interconnection control method may be an apparatus (a software apparatus, a hardware apparatus, or an apparatus implemented by means of combination of hardware and software) that can directly control a gating unit in an interconnection system, or may be another apparatus (a software apparatus, a hardware apparatus, or an apparatus implemented by means of combination of hardware and software) that can instruct an interconnection controller to set a gating unit to a status. The following describes steps of the method shown in FIG. 7 using an example in which the BMC is the execution body of the interconnection control method.

S701. Obtain a correspondence between a hard zone and an identifier of a CPU.

A computer device (such as a server) may include a plurality of CPUs. The computer device may include a hard zone, and the hard zone includes the plurality of CPUs.

Optionally, the computer device may include a plurality of hard zones. The plurality of CPUs are assigned to a plurality of different hard zones, and each hard zone includes one or more CPUs.

Optionally, a user may configure a hard zone. For example, the user may set a quantity of hard zones on an operation interface of the BMC. It is assumed that the computer device includes four CPUs: a CPU 0, a CPU 1, a CPU 2, and a CPU 3. When the computer device includes one hard zone, the CPU 0, the CPU 1, the CPU 2, and the CPU 3 are assigned to the hard zone, and the BMC of the computer device stores a correspondence between the hard zone and an identifier of a CPU. When the computer device includes two hard zones (for example, a hard zone 1 and a hard zone 2), the user may perform setting to assign two CPUs (for example, the CPU 0 and the CPU 1) of the four CPUs to one hard zone (for example, the hard zone 1), and assign remaining two CPUs (for example, the CPU 2 and the CPU 3) of the four CPUs to the other hard zone (for example, the hard zone 2), and the BMC stores correspondences between the two hard zones and identifiers of the CPUs according to division of the hard zones, for example, stores a correspondence between the hard zone 1 and the CPU 0, a correspondence between the hard zone 1 and the CPU 1, a correspondence between the hard zone 2 and the CPU 2, and a correspondence between the hard zone 2 and the CPU 3.

Optionally, the BMC may receive a first instruction for hard zone handover. For example, the first instruction includes a quantity of hard zones to be handed over to, such that the BMC may determine, according to the quantity of hard zones and a CPU included in the computer device, a hard zone to be handed over to and a correspondence between a hard zone and a CPU in the hard zone. Alternatively, the first instruction includes a CPU (which may be, for example, an identifier of a CPU) included in a hard zone to be handed over to, such that the BMC can determine, according to the first instruction, the hard zone to be handed over to and a correspondence between a hard zone and a CPU in the hard zone. Optionally, the user may trigger an operating system (OS), a basic input/output system (BIOS), or another system to generate the first instruction for hard zone handover, and may trigger the OS, the BIOS, or the other system to send the first instruction for hard zone handover to the BMC. Optionally, the first instruction for hard zone handover may be generated on another computer device, and the other computer device sends the first instruction for hard zone handover to a computer device that has a BMC, such that the BMC obtains the first instruction. Therefore, a device or a system on which the first instruction for hard zone handover is generated is not limited in this embodiment of the present application.

After the user configures the hard zone or the BMC receives the first instruction for hard zone handover, the BMC is restarted (for example, the computer device may be restarted to restart the BMC). When the BMC is restarted, the BMC may obtain a correspondence between a hard zone and a CPU.

S702. Determine J CPU groups in the hard zone according to the correspondence between the hard zone and the identifier of the CPU, where each of the J CPU groups includes two CPUs in the hard zone, and J is a positive integer less than or equal to I.

For example, the BMC may determine CPUs included in each hard zone according to the correspondence between the hard zone and the identifier of the CPU. In the hard zone, every two CPUs are used as one CPU group, and the BMC further determines whether, in I gating unit groups, there is a gating unit group that establishes a connection between the CPUs in the CPU group. It is assumed that in this embodiment of the present application, it is determined that gating unit groups corresponding to M CPU groups exist, where M is a positive integer less than or equal to I. J CPU groups may be determined in the M CPU groups. A determining manner may be determining according to a requirement or a user setting, or the M CPU groups may be directly used as the J CPU groups (that is, M is equal to J), where J is a positive integer less than or equal to M.

S703. A BMC determines J gating unit groups that establish connections for the J CPU groups.

For example, for each of the J CPU groups, for example, a CPU group 1, in the I gating unit groups, there is a gating unit group such as a gating unit group 1 that establishes a connection between two CPUs in the CPU group 1. Similarly, the BMC selects, from the I gating unit groups, the J gating unit groups that establish connections for the J CPU groups.

For example, a mapping table is stored in the BMC. The mapping table includes mapping relationships between the J gating unit groups and the J CPU groups. A connection between two CPUs in each of the J CPU groups is established by a gating unit group corresponding to the CPU group in the mapping table. In this way, the BMC can find, in the mapping table, a gating unit group corresponding to each of the J CPU groups.

S704. The BMC sets all gating units in each of the J gating unit groups to a first state.

The following provides three scenarios as an example to describe S704.

In a first implementation scenario, if the BMC can directly control each gating unit in the J gating unit groups, the BMC directly sets all the gating units in each of the J gating unit groups to the first state.

FIG. 1E is used as an example. J is equal to 1, and a gating unit group includes gating units G1 and G2. A first terminal of the gating unit G1 is connected to a CPU 1. A first terminal of the gating unit G2 is connected to a CPU 2. The BMC may directly set the gating unit G1 and the gating unit G2 to the first state. When the gating unit G1 and the gating unit G2 are set to the first state, the CPU 1 may be connected to the CPU 2 using a line connected between a second terminal of the gating unit G1 and a second terminal of the gating unit G2.

In a second implementation scenario, if the BMC cannot control all the J gating unit groups or cannot control each gating unit in the J gating unit groups, detailed steps for implementing S704 include S7041 and S7042.

S7041. The BMC determines an interconnection controller corresponding to each gating unit included in each of the J gating unit groups.

Each gating unit included in each of the J gating unit groups is controlled by the interconnection controller corresponding to the gating unit. It should be noted that, for each of the J gating unit groups, different gating units in the gating unit group may be controlled by a same interconnection controller or may be controlled by different interconnection controllers. For example, a gating unit group shown in FIG. 2A includes gating units G1 and G2 that are configured to connect a CPU 1 and a CPU 2, and the gating units G1 and G2 are controlled by a same interconnection controller. For example, a gating unit group shown in FIG. 4A includes gating units G1, G2, G3, and G4 that are configured to connect a CPU 1 and a CPU 2, and the gating units G1, G2, G3, and G4 are controlled by processing units of different NCs. Different gating unit groups in the J gating unit groups may be controlled by a same interconnection controller or may be controlled by different interconnection controllers. For example, as shown in FIG. 3, a gating unit G3 and a gating unit G4 that are configured to connect a CPU 1 and a CPU 0 may be used as a first gating unit group, and a gating unit G2 and a gating unit G1 that are configured to connect a CPU 2 and a CPU 3 may be used as a second gating unit group. The first gating unit group and the second gating unit group may be controlled by a same interconnection controller or controlled by different interconnection controllers. In this implementation scenario, the J gating unit groups are controlled by a plurality of interconnection controllers.

Optionally, the interconnection controller may be a BMC or a processing unit of an NC.

S7042. The BMC instructs the interconnection controller corresponding to each gating unit included in each of the J gating unit groups to set the gating unit to a first state.

The BMC stores an identifier of each interconnection controller, and an identifier of each gating unit controlled by the interconnection controller. Because the J gating unit groups are controlled by a plurality of interconnection controllers in this implementation scenario, after determining the interconnection controller corresponding to each gating unit in the J gating unit groups in S7041, the BMC separately sends a second instruction to all the determined interconnection controllers according to the identifier of the interconnection controller. The second instruction carries an identifier of a gating unit that is to be set to the first state by the interconnection controller that receives the second instruction. After receiving the second instruction, the interconnection controller sets the gating unit corresponding to the identifier to the first state according to the identifier carried in the second instruction. It is assumed that all the determined interconnection controllers include a first interconnection controller. The first interconnection controller may control a plurality of gating units G1, G2, G3, and G4. If the second instruction received by the first interconnection controller includes identifiers of the gating units G1 and G2 that form a same gating unit group, the first interconnection controller sets the gating units G1 and G2 to the first state after receiving the second instruction. Optionally, if the J gating unit groups include a gating unit controlled by the BMC, the BMC may generate a second instruction, and subsequently set the gating unit to the first state according to the second instruction. Alternatively, the BMC may not generate a second instruction, and may directly set a gating unit controlled by the BMC in the J gating unit groups to the first state.

Optionally, after receiving the second instruction, the interconnection controller obtains a status of a gating unit specified by the second instruction (that is, the gating unit that has the identifier carried by the second instruction). If the status of the gating unit is not the first state, the gating unit in the first state is not set to the first state.

In this way, all the gating units in the J gating unit groups are set to the first state, and a connection may be established for the J CPU groups in the hard zone using the J gating unit groups.

In a third implementation scenario, the BMC stores a status of each gating unit. For example, the BMC stores an identifier of each interconnection controller and an identifier of a gating unit controlled by each interconnection controller, and obtains, using the interconnection controller, and stores a status of the gating unit controlled by the interconnection controller.

When performing S704, the BMC locally obtains the stored status of each gating unit in the J gating unit groups. Then, the BMC determines which gating unit groups in the J gating unit groups include a gating unit that is not set to the first state. A determining result is that K gating unit groups include a gating unit that is not set to the first state. Therefore, K is a positive integer less than or equal to J. Finally, the BMC sets the gating unit that is not set to the first state in the K gating unit groups to the first state. If all gating units that are not set to the first state in the K gating unit groups are controlled by the BMC, the BMC directly sets the gating units to the first state. If all gating units that are not set to the first state in the K gating unit groups are controlled by a plurality of interconnection controllers, the BMC separately sends the second instruction to the plurality of interconnection controllers. The second instruction carries identifiers of the gating units that are not set to the first state, and the second instruction is used to instruct the plurality of interconnection controllers to set the gating units to the first state.

After S704 is performed, all the gating units in each of the J gating unit groups are set to the first state, and the J gating unit groups may separately establish a connection between two CPUs in a CPU group for the J CPU groups in the hard zone.

Apparatus Embodiment

Apparatus Embodiment 1

This embodiment of this application provides an interconnection control apparatus. The interconnection control apparatus includes functional units for implementing the interconnection control method provided in the foregoing method embodiment. Similar to the method embodiment, the interconnection control apparatus is applied to I gating unit groups. For a description of the I gating unit groups, refer to the related explanation in the method embodiment.

Figure 8:
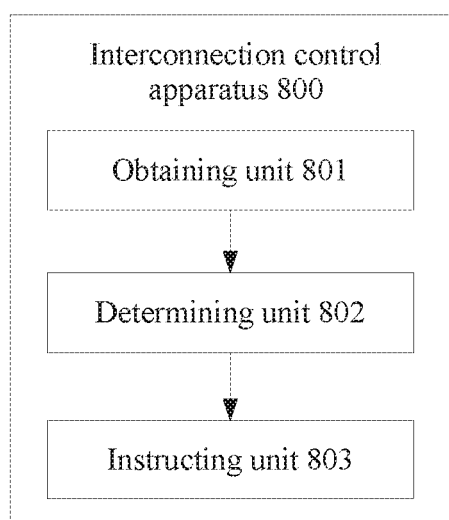
FIG. 8 is a schematic structural diagram of an interconnection control apparatus according to an embodiment of the present application.

FIG. 8 provides an example of an interconnection control apparatus 800 including the functional units.

The interconnection control apparatus 800 includes: an obtaining unit 801 configured to obtain a correspondence between a hard zone and a CPU; a determining unit 802 configured to determine J CPU groups in the hard zone according to the correspondence between the hard zone and an identifier of the CPU, where each of the J CPU groups includes two CPUs, J is a positive integer less than or equal to I, and where the determining unit 802 is further configured to determine J gating unit groups that establish connections for the J CPU groups; and an instructing unit 803 configured to set gating units in each of the J gating unit groups to a first state.

Optionally, the instructing unit 803 may be configured to: obtain statuses of the gating units in each of the J gating unit groups; determine K gating unit groups in the J gating unit groups, where each of the K gating unit groups includes a gating unit that is not set to the first state, and K is a positive integer less than or equal to J; and set the gating unit that is not set to the first state in the K gating unit groups to the first state.

Optionally, the instructing unit 803 may be configured to: determine an interconnection controller corresponding to each gating unit included in each of the J gating unit groups; and instruct the interconnection controller corresponding to each gating unit included in each of the J gating unit groups to set the gating unit to the first state.

Apparatus Embodiment 2

This embodiment of this application provides a BMC. Functional units for implementing the interconnection control method in the foregoing method embodiment are deployed in the BMC.

Apparatus Embodiment 3

This embodiment of this application provides a chassis management controller (CMC). Functional units for implementing the interconnection control method provided in the foregoing method embodiment are deployed in the CMC.

Apparatus Embodiment 4

This embodiment of this application provides an interconnection controller. Functional units corresponding to steps performed by an interconnection controller in the foregoing method embodiment are deployed in the interconnection controller.

Storage Medium Embodiment

An embodiment of this application provides a computer readable storage medium. The computer readable storage medium stores an instruction. When the instruction runs on a computer, an interconnection control apparatus (which may be, for example, a BMC or a CMC) is enabled to perform the interconnection control method in the foregoing method embodiment.

An embodiment of this application provides a computer readable storage medium. The computer readable storage medium stores an instruction. When the instruction runs on a computer, an interconnection controller is enabled to perform steps performed by an interconnection controller in the foregoing method embodiment.

Software Product Embodiment

An embodiment of this application provides a computer program product. The computer program product includes an instruction. When the instruction runs on a computer, an interconnection control apparatus (which may be, for example, a BMC or a CMC) is enabled to perform the interconnection control method in the foregoing method embodiment.

An embodiment of this application provides a computer program product. The computer program product includes an instruction. When the instruction runs on a computer, an interconnection controller is enabled to perform steps performed by an interconnection controller in the foregoing method embodiment.

Computer Device Embodiment

An embodiment of this application provides a computer device. The computer device includes the foregoing interconnection system (for example, the interconnection system provided in the interconnection system embodiment).

Optionally, the computer device may be a server.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An interconnection system, comprising:
a first node controller (NC) comprising a first gating unit and a third gating unit, wherein the first gating unit includes a first terminal and a second terminal, wherein the first terminal of the first gating unit is configured to connect to the third gating unit of the first NC, in order to connect to a first central processing unit (CPU) using the third gating unit, and wherein the first terminal is connected to the second terminal when the first gating unit is in a first state; and
a second NC comprising a second gating unit, wherein the second gating unit includes a third terminal and a fourth terminal, wherein the third terminal is configured to connect to a second CPU, and wherein the third terminal is connected to the fourth terminal when the second gating unit is in the first state,
wherein the second terminal is connected to the fourth terminal of the second gating unit, and wherein the first CPU is connected to the second CPU via the first NC and the second NC when the first gating unit, the second gating unit, and the third gating unit are all in the first state.

2. The interconnection system according to claim 1, wherein the second terminal is connected to the fourth terminal using a first line, and wherein the first CPU and the second CPU belong to a same node.

3. The interconnection system according to claim 1, further comprising an interconnection controller, wherein the first gating unit further comprises a fifth terminal connected to the interconnection controller, and wherein the second gating unit further comprises a sixth terminal connected to the interconnection controller.

4. The interconnection system according to claim 3, wherein the first terminal is connected to the fifth terminal when the first gating unit is in a second state.

5. The interconnection system according to claim 4, wherein the third terminal is connected to the sixth terminal when the second gating unit is in the second state.

6. The interconnection system according to claim 3, wherein the interconnection controller is configured to instruct the first gating unit and the second gating unit to be set to the first state.

7. The interconnection system according to claim 3, wherein the interconnection controller is a baseboard management controller (BMC) or an NC.

8. The interconnection system according to claim 1, wherein the first NC comprises the third gating unit and a fourth gating unit, wherein the third gating unit comprises a fifth terminal and a sixth terminal, wherein the fifth terminal is configured to connect to the first terminal, and wherein the fifth terminal is connected to the sixth terminal when the third gating unit is in the first state.

9. The interconnection system according to claim 8, wherein the fourth gating unit comprises a seventh terminal and an eighth terminal, wherein the seventh terminal is configured to connect to the first CPU or a fifth gating unit of the second NC, in order to connect to the first CPU using the fifth gating unit.

10. The interconnection system according to claim 9, wherein the seventh terminal is connected to the eighth terminal when the fourth gating unit is in the first state.

11. The interconnection system according to claim 10, wherein the sixth terminal is connected to the seventh terminal.

12. The interconnection system according to claim 8, wherein the first terminal is connected to the first CPU using the third gating unit when the third gating unit and the fourth gating unit are both in the first state.

13. The interconnection system according to claim 9, wherein the fifth terminal is connected to the eighth terminal using a second line.

14. The interconnection system according to claim 1, wherein the interconnection system is implemented in a computer device, and wherein the first C and the second CPU belong to different nodes.

* * * * *

UNITED STATES PATENT AND TRADEMARK OFFICE
CERTIFICATE OF CORRECTION

PATENT NO. : 11,100,039 B2
APPLICATION NO. : 16/673253
DATED : August 24, 2021
INVENTOR(S) : Defu Liao, Fei Zhang and Honghui Liu Page 1 of 1

It is certified that error appears in the above-identified patent and that said Letters Patent is hereby corrected as shown below:

In the Claims

Claim 14, Column 26, Line 50: "first C and the" should read "first CPU and the"

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*